(12) United States Patent
Makabe et al.

(10) Patent No.: US 7,669,690 B2
(45) Date of Patent: Mar. 2, 2010

(54) STEERING ANGLE SENSOR ARRANGEMENT STRUCTURE OF VEHICLE INTENDED FOR ROUGH ROAD USE

(75) Inventors: Takumi Makabe, Saitama (JP);
Tomokazu Sakamoto, Saitama (JP);
Hajime Uchiyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 890 days.

(21) Appl. No.: 11/367,596

(22) Filed: Mar. 6, 2006

(65) Prior Publication Data
US 2006/0196722 A1  Sep. 7, 2006

(30) Foreign Application Priority Data

| Mar. 7, 2005 | (JP) | ............................. 2005-062228 |
| Mar. 7, 2005 | (JP) | ............................. 2005-062229 |
| Mar. 18, 2005 | (JP) | ............................. 2005-080034 |

(51) Int. Cl.
*B62D 5/04* (2006.01)
(52) U.S. Cl. ...................................... 180/444; 180/443
(58) Field of Classification Search ................. 180/443, 180/444, 446, 908; 73/862.08, 117.02
See application file for complete search history.

(56) References Cited

U.S. PATENT DOCUMENTS

| 6,164,150 | A | * | 12/2000 | Shindo et al. ............. 74/388 PS |
| 6,374,664 | B1 | * | 4/2002 | Bauer et al. ............... 73/117.02 |
| 6,966,399 | B2 | * | 11/2005 | Tanigaki et al. ............. 180/444 |
| 2002/0013647 | A1 | * | 1/2002 | Kawazoe et al. ............... 701/41 |
| 2003/0089166 | A1 | * | 5/2003 | Mizuno et al. ............. 73/118.1 |
| 2005/0257993 | A1 | * | 11/2005 | Inui et al. ................... 180/446 |
| 2006/0180385 | A1 | * | 8/2006 | Yanai et al. ................. 180/444 |
| 2008/0116002 | A1 | * | 5/2008 | Jungbecker et al. ......... 180/444 |

FOREIGN PATENT DOCUMENTS

| JP | 2000-206215 A | 7/2000 |
| JP | 2002-316654 A | 10/2002 |
| JP | 2004-231011 A | 8/2004 |

* cited by examiner

*Primary Examiner*—Anne Marie M Boehler
(74) *Attorney, Agent, or Firm*—Birch, Stewart, Kolasch & Birch, LLP

(57) ABSTRACT

A removable steering angle sensor for a motor-driven power steering apparatus for use in a vehicle intended for rough road use. The handlebar of the vehicle is disposed on an upper portion of a steering shaft, and a motor-driven power steering apparatus, including a power assist portion as an actuator unit, is disposed in a middle portion of the steering shaft. The steering angle sensor for detecting a steering angle is disposed on one end of the steering shaft, or more specifically, on a lower end portion of an output shaft, or a leading end portion of an output shaft. During maintenance, this arrangement provides for easy removal and installation of the steering angle sensor.

1 Claim, 17 Drawing Sheets

STEERING ANGLE SENSOR ARRANGEMENT STRUCTURE OF VEHICLE INTENDED FOR ROUGH ROAD USE

CROSS-REFERENCE TO RELATED APPLICATION

The present application claims priority under 35 U.S.C. §119 to Japanese Patent Application Nos. 2005-062228 and 2005-062229, filed on Mar. 7, 2005, Japanese Patent Application Nos. 2005-080034, filed Mar. 18, 2005, the entire contents of which are hereby incorporated by reference.

BACKGROUND OF THE INVENTION

1. Field of the Invention

The present invention relates to an improved steering angle sensor arrangement structure used with a motor-driven power steering apparatus in a vehicle intended for rough road use. The motor-driven power steering apparatus uses an assist motor as a driving source for giving a steering mechanism a steering assist force. Also included is a power supply diagnostics device for supplying an electric power from a secondary battery and an alternator to an electric power load part.

2. Description of Background Art

Japanese Patent Laid-Open No. 2004-231011, for example, discloses a steering angle sensor arrangement structure of a vehicle intended for rough road use a type incorporating a potentiometer as a steering angle sensor for detecting a rotational angle of a steering shaft, or a steering angle, disposed in a gear case of a motor-driven power steering apparatus. As shown in FIG. 4 of Japanese Patent Laid-Open No. 2004-231011, a steering shaft 50 includes an upper side shaft 50a, a lower side shaft 50b, and a universal joint 51 for connecting together the upper side shaft 50a and the lower side shaft 50b. The steering shaft 50 is rotatably supported by an upper bracket 53 mounted in an upper pipe 18 and a lower bracket 54 mounted in a front cross pipe 23.

The lower side shaft 50b is a member that penetrates through a gear case 55 mounted in the lower bracket 54. The gear case 55 includes a potentiometer 61 for detecting a rotational angle and a rotational speed of the steering shaft 50.

Assume, for example, a situation, in which the potentiometer 61 becomes inoperative, requiring repair or replacement. If, in this case, the structure involved defies removal of the potentiometer 61 from the gear case 55, it becomes necessary to remove a whole motor-driven power steering apparatus from the upper pipe 18 and the front cross pipe 23, or to remove the lower bracket 54 from the front cross pipe 23 before removing the gear case 55. This makes maintenance of the potentiometer 61 troublesome and requires a large number of man-hours.

In addition, Japanese Patent Laid-Open No. 2002-316654, for example, discloses a motor-driven power steering apparatus using a steering angle sensor for detecting a turning angle of a steering shaft and controls an output torque (a steering assist force) of an assist motor by incorporating a value detected as the turning angle of the steering shaft.

The related art motor-driven power steering apparatus described above has the following disadvantages. Specifically, the conventional apparatus requires a steering angle sensor dedicated to the purpose and a control system as fail-safe means for the steering angle sensor. This has resulted in cost and weight being increased because of a complicated construction involved. Therefore, there is a demand for solving these problems.

Further, Japanese Patent Laid-Open No. 2000-206215, for example, discloses a power supply evaluation device for vehicles performing diagnostics of a battery, whether the battery is faulty or deteriorated, is based on a terminal voltage value and a discharge current value of the battery.

A battery is commonly said to be open if a battery voltage is weak or a battery terminal is disconnected, thus causing a voltage supplied from the battery to an electric part to be in short supply or interrupted. In such an open battery state, an electric power is supplied to each of the electric parts in a condition, in which a voltage from the battery is added to a voltage from an alternator, or in a form of only the voltage from the alternator. If a vehicle involved includes an electric power load part requiring relatively a large electric power, such as a motor-driven power steering or the like, the amount of electric power consumed for operating the part is excessively large, which is undesirable. There is a need for improving this drawback.

SUMMARY AND OBJECTS OF THE INVENTION

Therefore an object of the present invention is to address the problems associated with the motor-driven power steering apparatus, steering angle sensor and power supply evaluation device for vehicles describe above.

According to a first aspect of the present invention, in a vehicle intended for rough road use having a handlebar disposed on an upper portion of a steering shaft and a motor-driven power steering apparatus including an actuator unit disposed in a middle portion of the steering shaft, a steering angle sensor is provided for detecting a steering angle is disposed on one end of the steering shaft.

To perform a service job of the steering angle sensor, including inspection, repair, or replacement, the steering angle sensor is removed from one end of the steering shaft and, after the service job has been completed, the steering angle sensor is disposed on the one end of the steering shaft. Since there are only a very few obstacles to installation or removal in areas around the end of the steering shaft, the steering angle sensor can be easily removed or reinstalled. This makes for easy maintenance of the steering angle sensor including replacement of the same.

According to a second aspect of the present invention, the steering angle sensor is mounted at a leading end of the steering shaft via a coupling.

To perform a service job of the steering angle sensor, including inspection, repair, or replacement, the coupling is removed from the leading end of the steering shaft and the coupling is removed from the steering angle sensor as may be necessary. After the service job has been completed, the coupling and the steering angle sensor are reinstalled back again. In addition, even if, for example, the shape of the end of the steering shaft varies according to a vehicle model, use of a coupling in accordance with the difference allows a general-purpose steering angle sensor to be used regardless of the vehicle model involved. This contributes to reduction in cost.

According to a third aspect of the present invention, the steering angle sensor is disposed near a bearing for rotatably supporting the steering shaft.

The bearing for rotatably supporting the steering shaft is hard to vibrate since the bearing is mounted at, for example, a portion having a high stiffness in a vehicle body frame. Disposing the steering angle sensor near such a bearing that is hard to vibrate helps suppress vibration of the steering angle sensor. Accordingly, the steering angle sensor can be prevented from operating erratically. Performance of the steering angle sensor can thereby be maintained over an even longer period of time.

According to a fourth aspect of the present invention, the steering angle sensor includes a rotational shaft that rotates based on rotation of the steering shaft and a housing that covers an outer periphery of the rotational shaft and that the rotational shaft has an outside diameter smaller than the outside diameter of the steering shaft.

The rotational shaft having an outside diameter smaller than the outside diameter of the steering shaft helps make the steering angle sensor built compactly. For example, if the steering angle sensor is arranged to include therein a bearing for supporting the rotational shaft, the bearing can be made smaller.

According to a fifth aspect of the present invention, a power supply diagnostics device for a vehicle (for example, a saddle riding type four-wheeled vehicle 1 according to an embodiment of the present invention) having a secondary battery (for example, a battery 940 according to the embodiment of the present invention), to which an electric power generated by an alternator (for example, an alternator 950 according to the embodiment of the present invention) is supplied, the secondary battery for supplying the electric power to a predetermined electric power load part (for example, a steering assist motor 820 according to the embodiment of the present invention).

The power supply diagnostics device includes a voltage fluctuation detection section (for example, a voltage fluctuation detection portion 930*a* according to the embodiment of the present invention) for detecting fluctuations in a supply voltage to the electric power load part; an open battery determination section (for example, an open battery determination portion 930*b* according to the embodiment of the present invention) for determining whether there is developing an open battery condition or not based on results of detection made by the voltage fluctuation detection section; and an electric power supply shutdown section (for example, an electric power supply shutdown portion 930*c* according to the embodiment of the present invention) for shutting down supply of an electric power to the electric power load part based on results of determination made by the open battery determination section. The power supply diagnostics device also includes an open battery determination section determine that there is developing the open battery condition when the supply voltage fluctuates so as to fall outside a predetermined range between an upper limit value and a lower limit value and that the fluctuation meets a predetermined condition and the electric power supply shutdown section shut down the supply of the electric power to the electric power load part when it is determined that there is developing the open battery condition.

According to a sixth aspect of the present invention, the predetermined condition is met when a period of time, during which the supply voltage falls outside the predetermined range, lasts a predetermined period of time or more.

According to a seventh aspect of the present invention, the predetermined condition is met when the supply voltage falls outside the predetermined range a predetermined number of times or more.

According to an eighth aspect of the present invention, the electric power load part includes a steering assist motor. Accordingly, in the open battery condition of the vehicle, fluctuations in the supply voltage to the electric power load part, such as the steering assist motor or the like, occur when a ratio of the supply voltage from the alternator becomes greater. When such fluctuations meet a predetermined condition (for example, any one of the aforementioned predetermined conditions), the supply of electric power to the electric power load part from the alternator is shut down so that the supply of electric power to other electric parts (for example, a lighting apparatus or the like) in the vehicle can be secured.

According to a ninth aspect of the present invention, the electric power supply shutdown section shut down the supply of the electric power to the electric power load part when it is determined that there is developing the open battery condition a predetermined number of times. Accordingly, accuracy in detecting the open battery condition can be enhanced. In addition, a shutdown of the supply of electric power to the electric power load part by false detection can be prevented. Further, it is possible to suppress the amount of electric power required by the electric power load parts in the open battery condition, thereby securing the supply of electric power to each of different electric parts as a whole of the vehicle.

According to a tenth aspect of the present invention, the power supply diagnostics device further includes an alarm section (for example, an alarm lamp 970 according to the embodiment of the present invention) for issuing a warning to an occupant when it is determined that there is developing the open battery condition. Accordingly, it is possible to make the occupant aware that there is developing the open battery condition. In addition, easy and positive maintenance control of the vehicle can be performed.

According to an eleventh aspect of the present invention, the supply of the electric power from the alternator to the secondary battery and the electric power load part is performed via a voltage regulator (for example, a voltage regulator 96 according to the embodiment of the present invention).

Accordingly, the width of fluctuations in the supply voltage to each of different electric parts in the open battery condition can be set in accordance with the performance of the voltage regulator. Thus, each of the electric parts can be operated stably even in the open battery condition.

According to a twelfth aspect of the present invention, a vehicle has a steering assist mechanism (for example, a power steering system 800 according to the embodiment of the present invention) by means of an electric motor (for example, the steering assist motor 820 according to the embodiment of the present invention). The vehicle is characterized in that when fluctuations in the supply voltage to the electric motor meet a predetermined condition, control of the steering assist mechanism is not provided.

According to a thirteenth aspect of the present invention, the motor-driven power steering apparatus uses an assist motor (for example, a power assist motor 820 according to an embodiment of the present invention) as a driving source for giving a steering mechanism a steering assist force. The apparatus includes turning angle calculation means (for example, turning angle calculation portion 930*d*) for detecting a motor rotational speed based on a voltage and a current of the assist motor and calculating a relative turning angle of a steering shaft (for example, a steering shaft 250) based on the motor rotational speed; and reference position estimation means (for example, reference position estimation portions 930*e*, 193*e*, 293*e*) for estimating a turning reference position of the steering shaft based on movement of the steering shaft.

According to the foregoing arrangements, knowing the relative turning angle (a turning angle from any arbitrary position) of the steering shaft and the turning reference position (a turning reference state relative to a vehicle body) of the steering shaft allows the relative turning angle from the turning reference position, that is, an absolute turning angle of the steering shaft to be detected.

According to a fourteenth aspect of the present invention, the turning reference position is a position, at which the absolute turning angle of the steering shaft is 0° (a vehicle position traveling in a straight ahead direction).

According to a fifteenth aspect of the present invention, a maximum turning detection means (for example, maximum turning switches 101 according to the embodiment of the present invention) is provided for detecting the maximum turning of the steering shaft. The reference position estimation means estimates the turning reference position of the steering shaft when the maximum turning detection means detect the maximum turning of the steering shaft. With this arrangement, when the steering shaft is turned fully clockwise or counterclockwise, it is now possible to find the absolute turning angle of the steering shaft that is previously set to a predetermined angle. Based on this known absolute turning angle, it becomes possible to estimate the turning reference position (a position, at which the absolute turning angle is 0°) of the steering shaft and detect the absolute turning angle of the steering shaft.

According to a sixteenth aspect of the present invention, a reference position estimation means is provided for estimating the turning reference position of the steering shaft when a variation width of the relative turning angle of the steering shaft reaches a predetermined value. As a result, the variation width of the relative turning angle of the steering shaft (which corresponds to the amount of variation between a clockwise turning end and a counterclockwise turning end) reaches the predetermined value (which corresponds to the amount of variation between the maximum clockwise turning and the maximum counterclockwise turning), it is now possible to find the absolute turning angle of the steering shaft at the clockwise turning end and at the counterclockwise turning end of the variation width. Based on the known absolute turning angles, it becomes possible to estimate the turning reference position (the position, at which the absolute turning angle is 0°) of the steering shaft and detect the absolute turning angle of the steering shaft.

According to a seventeenth aspect of the present invention, a torque detection means (for example, a torque sensor 910 according to the embodiment of the present invention) is provided for detecting a steering torque and vehicle speed detection means (for example, a vehicle speed sensor 103 according to the embodiment of the present invention) for detecting a vehicle speed. The reference position estimation means estimate the turning reference position of the steering shaft when a condition, in which a detection value of the torque detection means is equal to or less than a predetermined value and a detection value of the vehicle speed estimation means is equal to or more than a predetermined value, continues to exist for a predetermined period of time.

As a result, if the condition, in which the steering torque is equal to or less than a predetermined value and the vehicle speed is equal to or more than a predetermined value, continues to exist for a predetermined period of time, it can then be estimated that the absolute turning angle of the steering shaft is maintained at a constant value (0°). It is then possible, based on the foregoing, to estimate the turning reference position (the position, at which the absolute turning angle is 0°) of the steering shaft and detect the absolute turning angle of the steering shaft.

The features described above enable finely-tuned control of the steering assist force incorporating the parameter of the steering angle of the steering shaft, while achieving reduction in cost and weight by eliminating the need for the dedicated steering angle sensor or fail-safe measures.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Steering Angle Sensor Arrangement Structure

The steering angle sensor arrangement structure of a vehicle with a motor-driven power steering apparatus will be described with reference to FIGS. 1-7.

Figure 1:
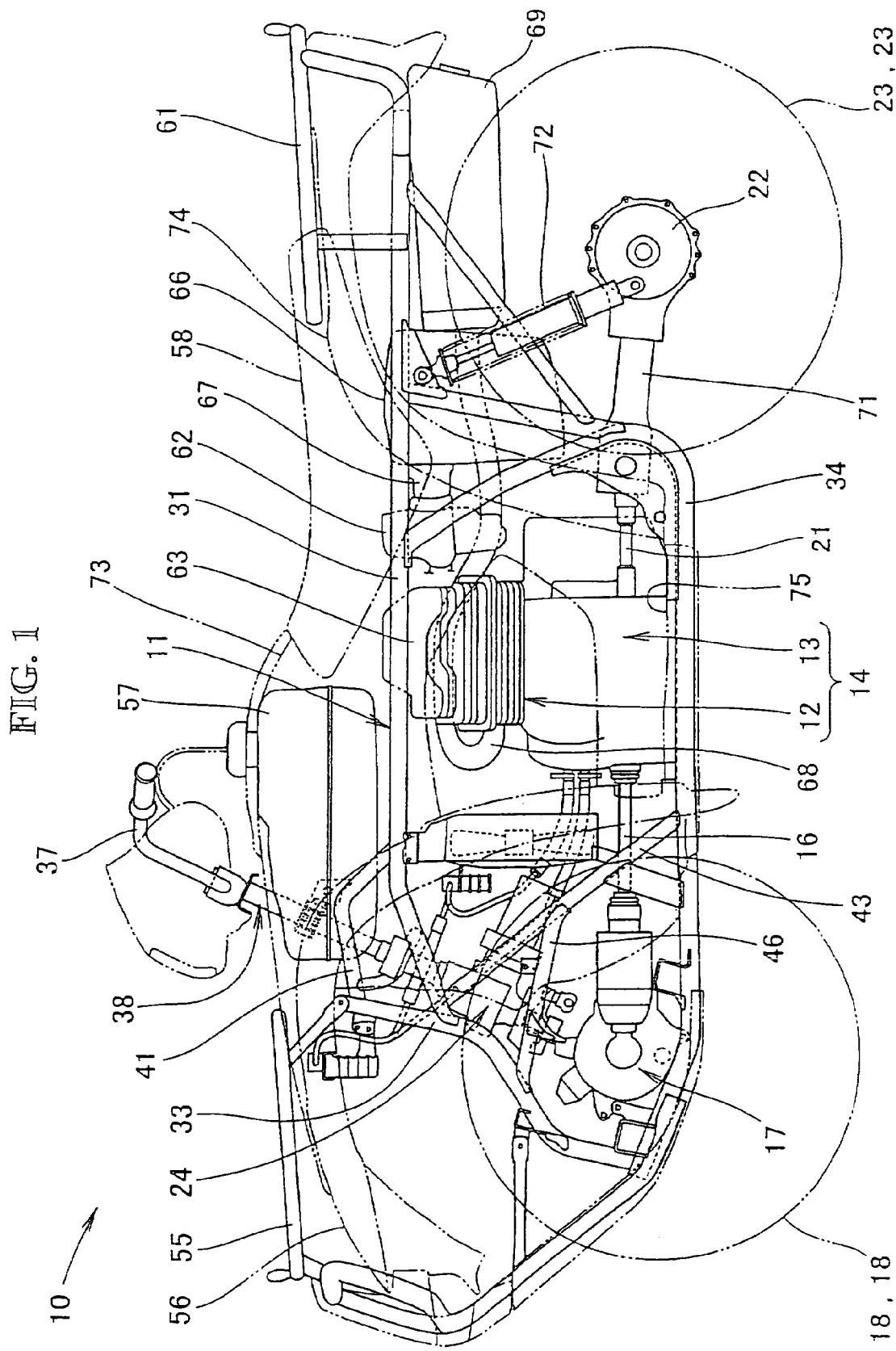
FIG. 1 is a side elevational view showing a vehicle intended for rough road use including a motor-driven power steering apparatus according to an embodiment of the present invention.

FIG. 1 is a side elevational view showing a vehicle intended for rough road use including a motor-driven power steering apparatus according to an embodiment of the present invention. A vehicle intended for rough road use 10 is a four-wheel-drive vehicle including a power unit 14 mounted at a central portion of a vehicle body frame 11. The power unit 14 includes an engine 12 and a transmission 13. A front final reduction gear apparatus 17 is connected to a front portion of the transmission 13 via a front propeller shaft 16.

Right and left front wheels 18, 18 are connected to the front final reduction gear apparatus 17 via a drive shaft not shown. A rear final reduction gear apparatus 22 is connected to a rear portion of the transmission 13 via a rear propeller shaft 21. Right and left rear wheels 23, 23 are connected to the rear final reduction gear apparatus 22 via a drive shaft not shown. The vehicle intended for rough road use 10 further includes a motor-driven power steering apparatus 24 for lightening a steering force required for steering the front wheels 18, 18.

The vehicle body frame 11 includes a pair of right and left upper main frames 31, 32 (only reference numeral 31 representing the upper main frame on a proximal side is shown), a front frame 33, a pair of right and left lower main frames 34, 36 (only reference numeral 34 representing the lower main frame on the proximal side is shown), a pair of right and left front upper frames 41, 42 (only reference numeral 41 representing the front upper frame on the proximal side is shown), a pair of right and left inclined frames 43, 44 (only reference numeral 43 representing the inclined frame on the proximal side is shown), and a pair of right and left sub-inclined frames 46, 47 (only reference numeral 46 representing the sub-inclined frame on the proximal side is shown). The upper main frames 31, 32 extend in the fore-aft direction. The front frame 33 of an inverted U shape in a front view is connected to a front end each of the upper main frames 31, 32. The lower main frames 34, 36 are connected to a lower end of the front frame 33 and middle portions of the upper main frames 31, 32.

The front upper frames 41, 42 of a dogleg shape are connected to an upper end of the front frame 33 and the upper main frames 31, 32 for supporting rotatably an upper portion of a steering shaft 38 having a handlebar 37 disposed on an upper end thereof. The inclined frames 43, 44 extending rearwardly and downwardly from front ends of the upper main frames 31, 32 are connected to the lower main frames 34, 36. The sub-inclined frames 46, 47 are connected to and across middle portions of the inclined frames 43, 44 and the front frame 33 so as to support a lower portion of the motor-driven power steering apparatus 24.

Also shown are a front carrier 55, a front fender 56 covering areas upward and rearward of the front wheels 18, a fuel tank 57, a seat 58, a rear carrier 61, and a carburetor 62 connected to a rear portion side of a cylinder head 63 of the engine 12. An air cleaner 66 is connected to the carburetor 62 via a connecting tube 67. An exhaust pipe 68 extends rearwardly of the vehicle from a front portion of the cylinder head 63. A muffler 69 is connected to a rear end of the exhaust pipe 68. A swing arm 71 is for supporting swingably the rear wheels 23, 23 relative to the side of the lower main frames 34, 36. Reference numerals 72, 72 (only reference numeral 72 representing the part on the proximal side is shown) represent a pair of right and left rear cushion units mounted across the swing arm 71 and the side of the upper main frames 31, 32. A body side cover 73 is disposed alongside the power unit 14. Reference numeral 74 represents a rear fender covering areas forward and upward of the rear wheels 23, 23. Also shown is a step floor 75.

Figure 2:
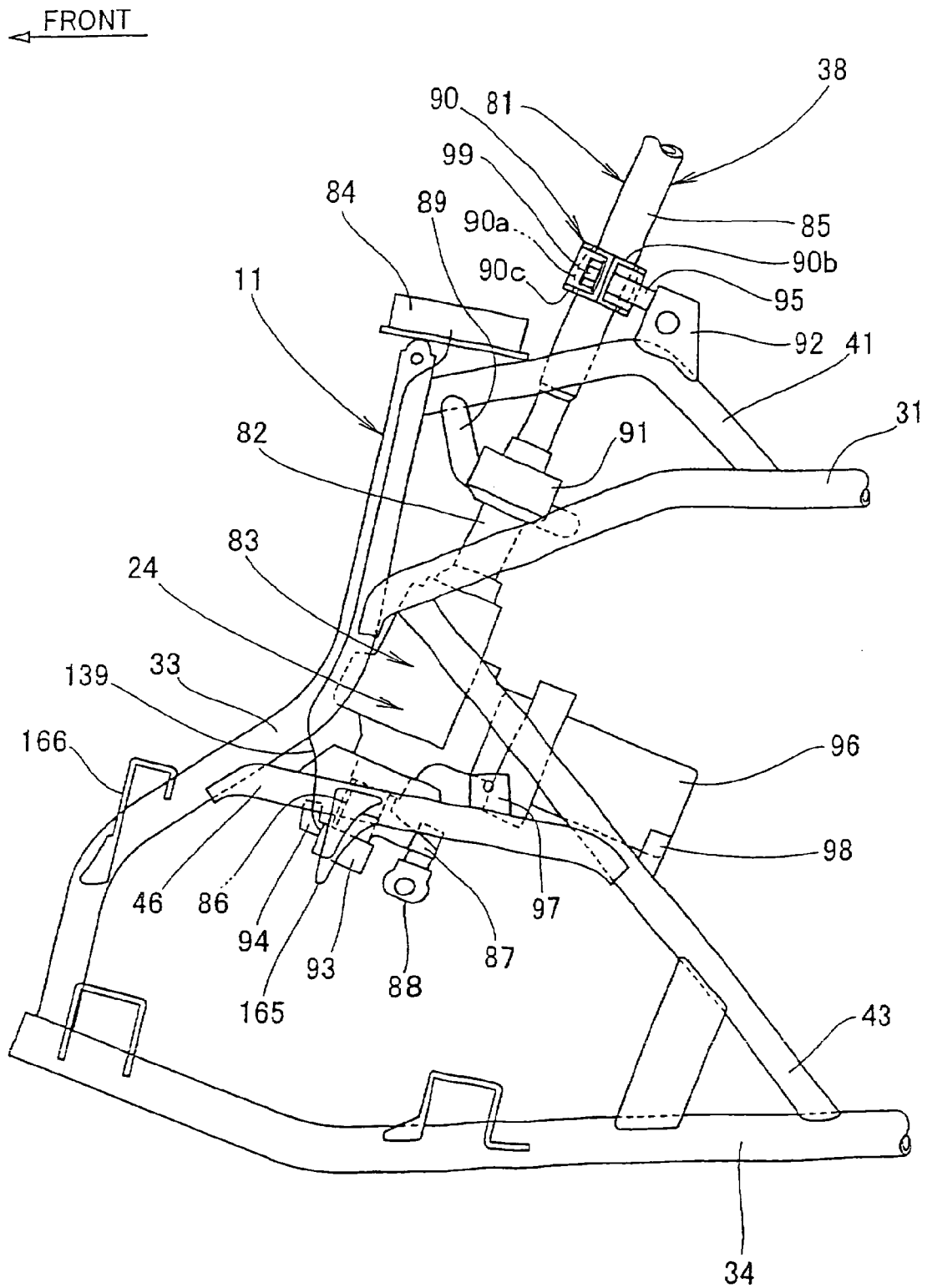
FIG. 2 is a side elevational view showing principal parts of the vehicle intended for rough road use according to the embodiment of the present invention.

FIG. 2 is a side elevational view showing principal parts of the vehicle intended for rough road use according to the present invention (an arrow (FRONT) shown in FIG. 2 points toward front of the vehicle; the same applies hereunder). The motor-driven power steering apparatus 24 includes a steering device 81, a torque sensor portion 82, a power assist portion 83, and a control portion 84. The steering device 81 steers the front wheels. The torque sensor portion 82 detects a steering torque. The power assist portion 83 generates a power drive for assisting a steering force. The control portion 84 controls the power assist portion 83 based on the steering torque detected by the torque sensor portion 82 or the like.

The steering device 81 includes the handlebar 37 (see FIG. 1), an input shaft 85, an output shaft 86, a steering arm 87, a pair of right and left ball joints 88, 88 (only reference numeral 88 representing the ball joint on the proximal side is shown), and a pair of right and left tie rods (not shown). The input shaft 85 supports the handlebar 37. The output shaft 86 is connected to the input shaft 85 via the torque sensor portion 82. The steering arm 87 is mounted to a lower end portion of the output shaft 86. The ball joints 88, 88 are mounted on the steering arm 87. One end of each of the tie rods are connected to the ball joints 88 and the other ends of the tie rods are connected to knuckles (not shown) on the side of the front wheels 18 (see FIG. 1). The input shaft 85 and the output shaft 86 are members constituting the steering shaft 38.

The input shaft 85 is a member supported at two places. The input shaft 85 is supported at one place by an upper portion bearing portion 90 and at the other place by an intermediate bearing portion 91 disposed downward of the upper portion bearing portion 90.

The upper portion bearing portion 90 is mounted on a support bracket 92 placed across the right and left front upper frames 41, 42 (only reference numeral 41 representing the front upper frame on the proximal side is shown) by way of two collars 95, 95 (only reference numeral 95 representing the collar on the proximal side is shown) using bolts 99, 99 (only reference numeral 99 representing the bolt on the proximal side is shown). The upper portion bearing portion 90 includes a radial bearing (plain bearing) 90a supporting rotatably the input shaft 85 and a pair of bearing holding members 90b, 90c for holding by clamping the radial bearing 90a.

The intermediate bearing portion 91 is supported by an intermediate bearing support bracket (not shown) mounted to sub-upper frames 89, 89 (only reference numeral 89 representing the sub-upper frame on the proximal side is shown).

The sub-upper frames 89, 89 are placed across the front upper frames 41, 42 and the upper main frames 31, 32 (only reference numeral 31 representing the upper main frame on the proximal side is shown), respectively.

The output shaft 86 includes a steering angle sensor 93 for detecting a steering angle (specifically, a rotational angle of the steering shaft 38). The steering angle sensor 93 is disposed on a leading end of the output shaft 86. The steering angle sensor 93 is mounted on the sub-inclined frames 46, 47 (only reference numeral 46 representing the sub-inclined frame on the proximal side is shown) via a bracket 94.

The torque sensor portion 82 is a torsion bar (not shown) disposed between the side of the input shaft 85 and the side of the output shaft 86.

When the input shaft 85 is turned through operation of the handlebar 37 (see FIG. 1), a relative rotational angle is produced between the input shaft 85 and the output shaft 86, which twists the torsion bar. An amount of this twist is translated to a corresponding value of torque to find the steering torque. It is to be noted herein that, instead of using the amount of twist of the torsion bar to detect the torque, the torque sensor portion 82 may detect the torque using a strain sensor (not shown).

The power assist portion 83 includes an electric motor 96, a clutch (not shown), and a reduction gear (not shown; including a worm gear and a worm wheel). The clutch and the reduction gear are inserted between an output shaft of the electric motor 96 and the output shaft 86.

The electric motor 96 is supported by a motor support member 98. The motor support member 98 is mounted as follows. Specifically, a front end portion side thereof (on the side of the output shaft 86) is mounted on motor brackets 97, 97 (only reference numeral 97 representing the motor bracket on the proximal side is shown) disposed on the sub-inclined frames 46, 47. A rear end portion side is placed across the right and left inclined frames 43, 44 (only reference numeral 43 representing the inclined frame on the proximal side is shown).

The control portion 84 controls the power assist portion 83 based on the steering torque detected by the torque sensor portion 82, the steering angle detected by the steering angle sensor 93, the vehicle speed of the vehicle intended for rough road use 10 (see FIG. 1), and the like. The control portion 84 is disposed on an inner side of the vehicle body of the right and left front upper frames 41, 42. The control portion 84 is then connected electrically to the steering angle sensor 93 with a conducting wire 139 wired along the front frame 33.

Figure 3:
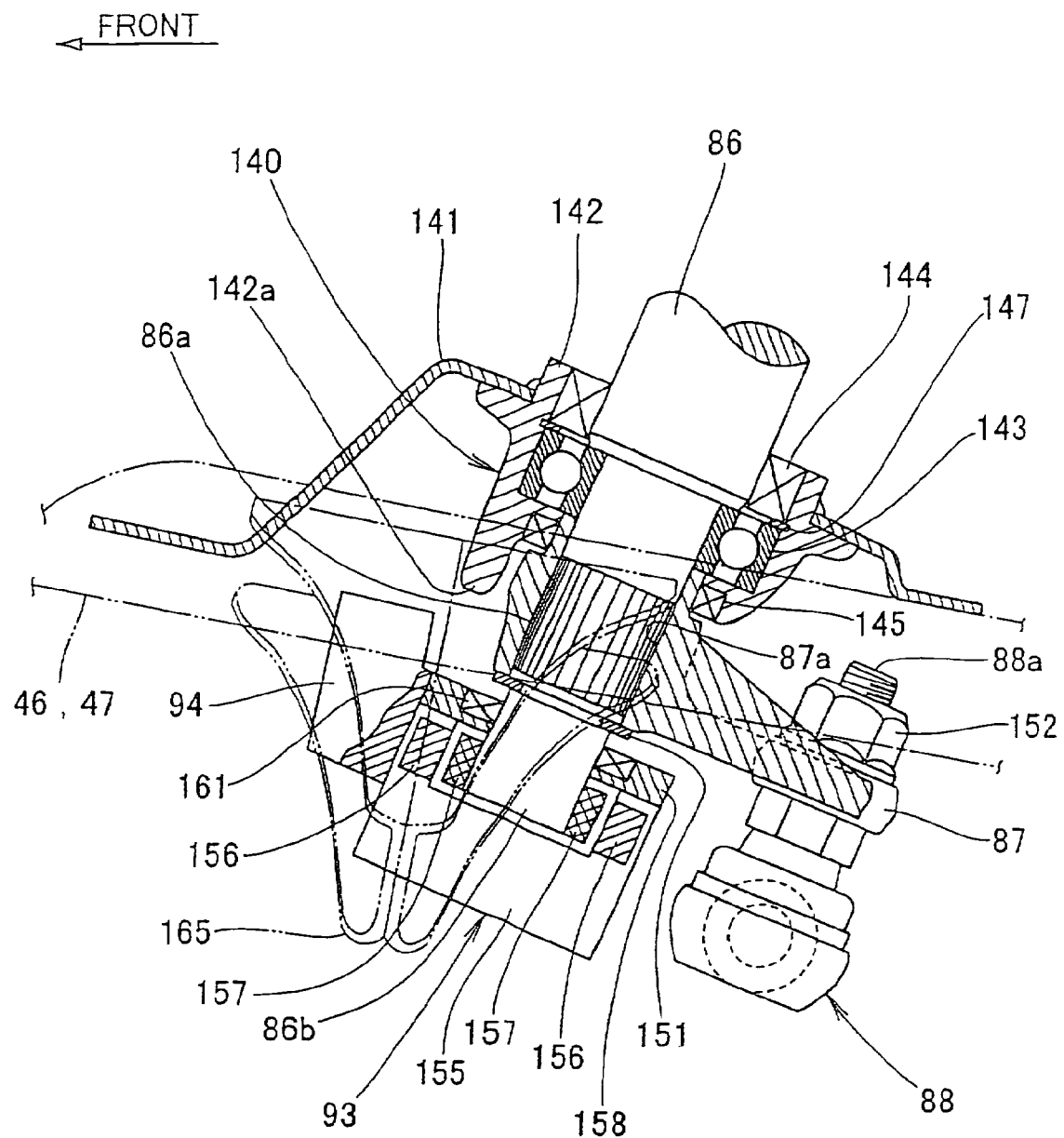
FIG. 3 is a cross-sectional view for illustrating a steering angle sensor disposed near a portion for supporting a lower end of an output shaft according to the embodiment of the present invention.

FIG. 3 is a cross-sectional view for illustrating the steering angle sensor disposed near a portion for supporting a lower end of the output shaft. An output shaft bearing portion 140 for supporting rotatably the output shaft 86 includes a shaft support member 142, a bearing 143, and sealing members 144, 145. The shaft support member 142 is mounted at a central portion of a bottom plate 141 supported by the sub-inclined frames 46, 47. The bearing 143 is mounted on the shaft support member 142 so as to support rotatably the output shaft 86. The sealing members 144, 145 protect the bearing 143 from dust and the like. Reference numeral 147 represents a snap ring for preventing the bearing 143 from coming off the shaft support member 142.

The shaft support member 142 includes a downward protrusion portion 142a. The downward protrusion portion 142a is formed at a front portion of the shaft support member 142 so as to protrude downwardly substantially along the output shaft 86. When the output shaft 86 is rotated through a predetermined angle by turning the handlebar, a side protrusion portion (not shown) disposed on the steering arm 87 abuts against the downward protrusion portion 142a, thus restricting a rotational angle range of the output shaft 86. The aforementioned downward protrusion portion 142a serves as a stopper for restricting the rotational angle range of the output shaft 86.

The steering arm 87 is mounted on an end portion of the output shaft 86 with a snap ring 151. Splines 87a formed on an inner peripheral surface of the steering arm 87 are in splined connection with splines 86a formed on the lower end portion of the output shaft 86.

The ball joint 88 is a member mounted to a rear portion of the steering arm 87 with a bolt portion 88a disposed on an end portion of the ball joint 88 and a nut 152.

The steering angle sensor 93 includes a housing 155, a plurality of detecting portions 156, a plurality of detected portions 157, a cover member 158, and a sealing member 161. The housing 155 is supported by the bracket 94. The detecting portions 156 are mounted inside the housing 155. The detected portions 157 are mounted on an outer peripheral surface of a leading end portion 86b of the output shaft 86 so as to be detected by the detecting portions 156. The cover member 158 plugs up an opening in the housing 155. The output shaft 86 penetrates through the cover member 158. The sealing member 161 seals a gap between the cover member 158 and the output shaft 86.

As described in the foregoing, the leading end portion 86b of the output shaft 86 serves as a detection shaft for supporting the detected portions 157 of the steering angle sensor 93. This makes for a simple structure of the steering angle sensor 93, thus allowing cost of the steering angle sensor 93 to be reduced.

The steering angle sensor 93 may be removed for inspection, repair, replacement, and other service jobs as follows. Specifically, a screw (not shown) for securing the cover member 158 to the housing 155 is first removed. A bolt (not shown) for fastening the housing 155 to the bracket 94 is then removed.

Disposing the steering angle sensor 93 on one end of the output shaft 86 as described above allows the steering angle sensor 93 to be removed or reinstalled easily.

FIGS. 2 and 3 illustrate an upper arm support bracket 165. As shown in FIG. 2, the upper arm support bracket 165 is mounted to the sub-inclined frame 46, and bracket 166 is mounted to the front frame 33. The upper arm (not shown) forming a front wheel suspension is mounted to the upper arm support bracket 165 and bracket 166.

The upper arm support bracket 165, as disposed on a side outside the steering angle sensor 93, covers to protect the side of the steering angle sensor 93.

As described above with reference to FIGS. 2 and 3, the present invention is applied to the vehicle intended for rough road use 10 (see FIG. 1) having the handlebar 37 disposed on the upper portion of the steering shaft 38 and the motor-driven power steering apparatus 24 disposed in the middle portion of the steering shaft 38, the apparatus including the power assist portion 83 as an actuator unit. The present invention is characterized in that the steering angle sensor 93 for detecting the steering angle is disposed on one end of the steering shaft 38, more specifically, the lower end portion or the leading end portion 86b of the output shaft 86.

Since the steering angle sensor 93 is disposed on one end of the steering shaft 38, the steering angle sensor 93 can be easily installed at, or removed from, the leading end portion 86b of the output shaft 86, that is, a place at which there is no obstacle around. This makes for easy replacement or other service job of the steering angle sensor 93.

Referring to FIG. 3, the present invention is characterized in that the steering angle sensor 93 is disposed on one end of the steering shaft 38, more specifically, near the bearing 143 serving as a bearing for supporting rotatably the output shaft 86.

Since the steering angle sensor 93 is disposed near the bearing 143, it is possible to dispose the steering angle sensor 93 at a position that is hard to vibrate. Accordingly, the steering angle sensor 93 can be prevented from operating erratically. Performance of the steering angle sensor 93 can thereby be maintained over an even longer period of time.

Figure 4:
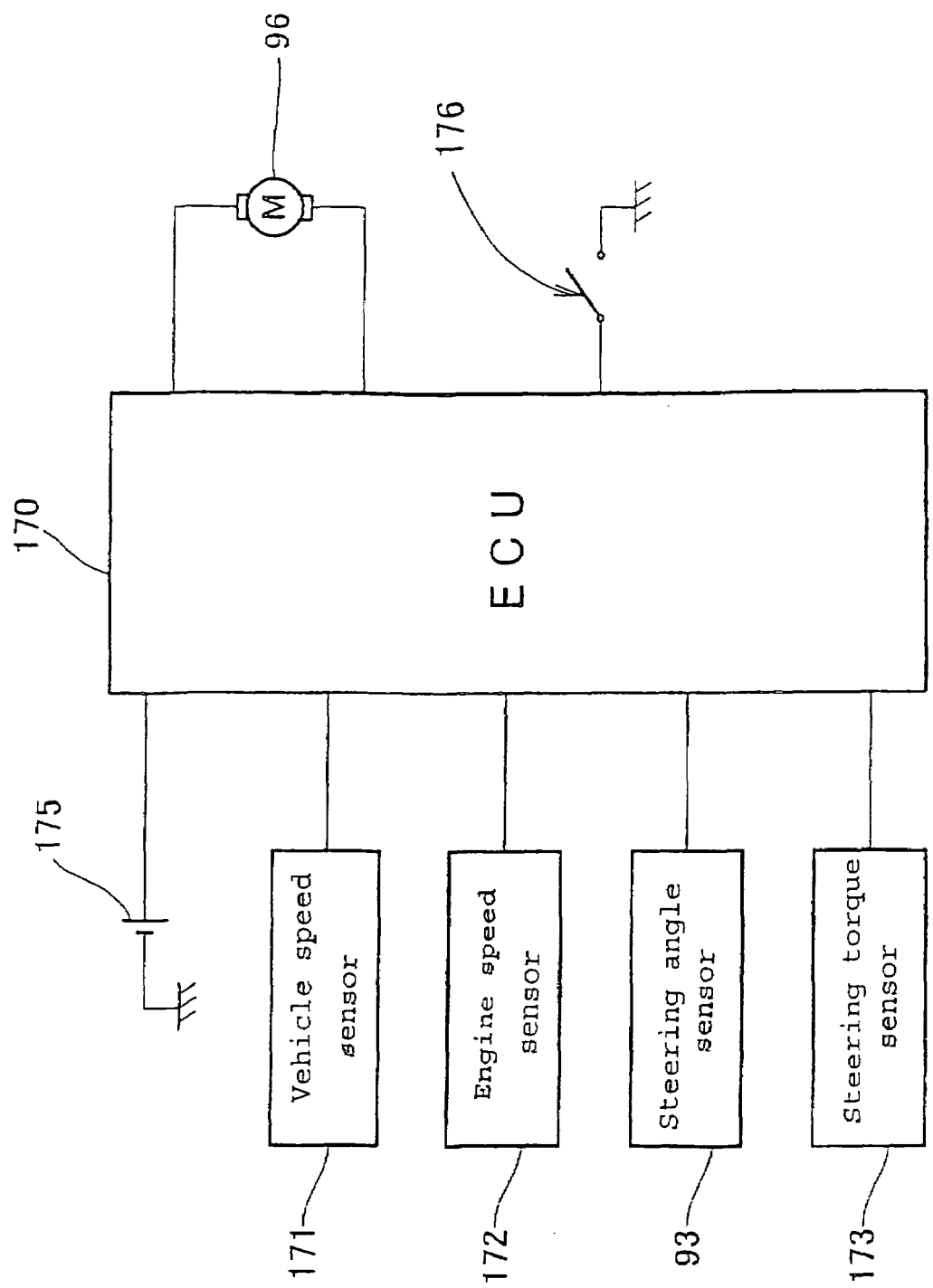
FIG. 4 is a block diagram showing a control portion of the motor-driven power steering apparatus according to the embodiment of the present invention.

FIG. 4 is a block diagram showing the control portion of the motor-driven power steering apparatus according to the embodiment of the present invention. The control portion 84 forming part of the motor-driven power steering apparatus, that is, an ECU (engine control unit) 170 controls the electric motor 96 based on signals provided by a vehicle speed sensor 171 for detecting the vehicle speed, an engine speed sensor 172 for detecting an engine speed, the steering angle sensor 93 for detecting the steering angle of the steering shaft 38 (see FIG. 2), and a steering torque sensor 173, which forms part of the torque sensor portion 82 (see FIG. 2), for detecting the steering torque. Reference numeral 175 represents a power supply of the ECU 170. Reference numeral 176 represents an emergency switch for stopping the operation of the ECU 170 in emergencies.

Figure 5:
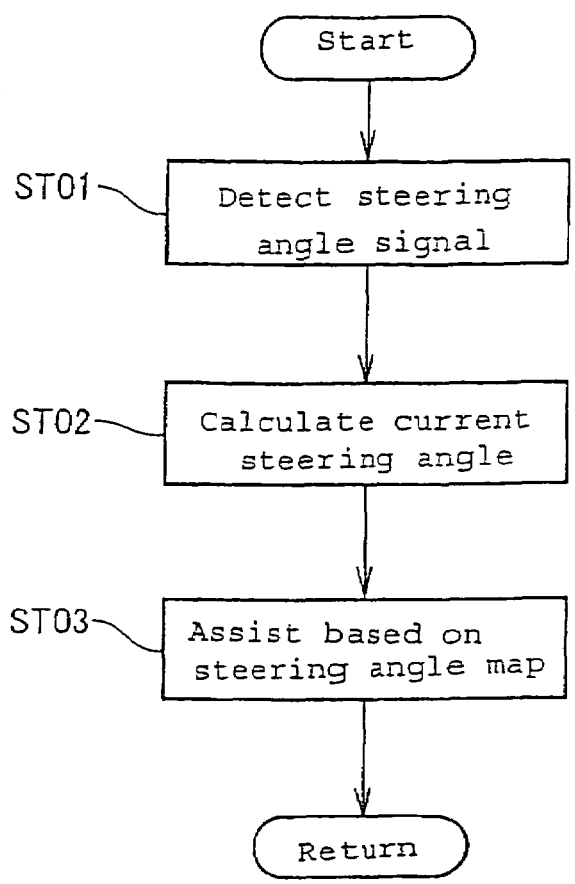
FIG. 5 is a flowchart showing a control flow performed by the control portion of the motor-driven power steering apparatus according to the embodiment of the present invention.

FIG. 5 is a flowchart showing a control flow performed by the control portion of the motor-driven power steering apparatus according to the embodiment of the present invention. STXX in the flowchart represents a step number. (See FIG. 4 for reference numerals.)

ST01: Detect a steering angle signal from the steering angle sensor 93.

ST02: Calculate a current steering angle based on the steering angle signal.

ST03: Provide control for generating an assist force using the electric motor 96 based on a steering angle map.

The steering angle map will be described in detail with reference to FIG. 6.

Figure 6:
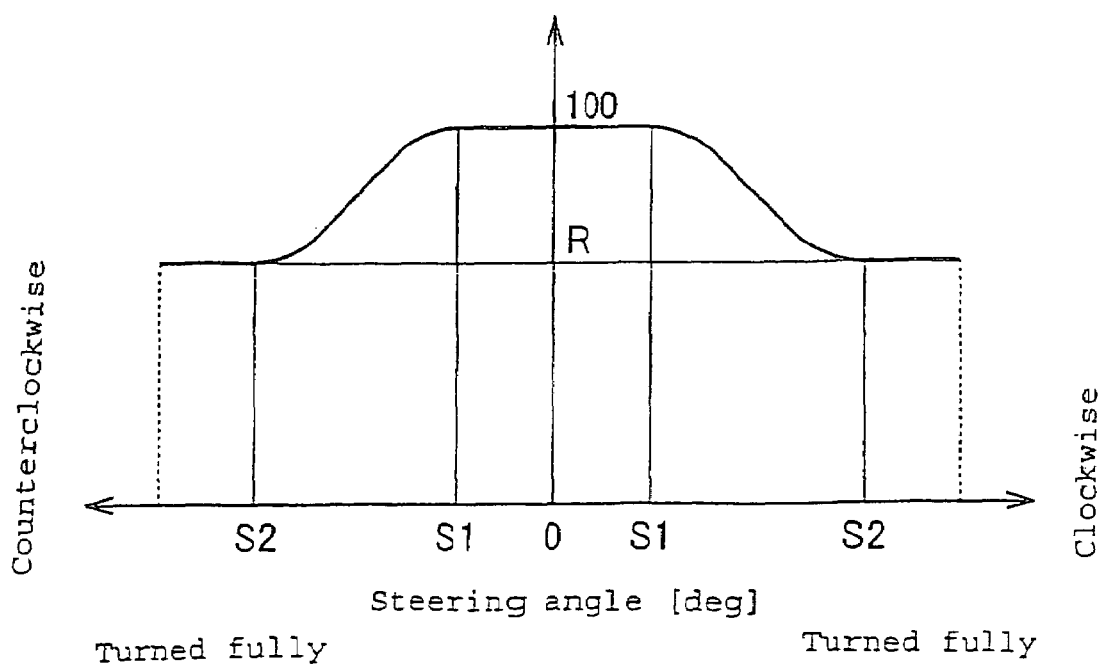
FIG. 6 is a graph showing a steering angle map used for the control of the motor-driven power steering apparatus according to the embodiment of the present invention.

FIG. 6 is a graph showing the steering angle map used for the control of the motor-driven power steering apparatus according to the embodiment of the present invention. The ordinate represents a ratio (in %) of the assist force by the electric motor 96 (see FIG. 4), while the abscissa represents the steering angle (in degrees). The ratio of the assist force by the electric motor 96 is the assist force by the electric motor 96 divided by a value translated in force from the steering torque detected by the steering torque sensor 173 (see FIG. 4).

Referring to FIG. 6, while a steering angle in a clockwise or counterclockwise direction remains small, the ratio 100%; specifically, the assist force by the electric motor 96 is equivalent to a value translated to the force of the steering torque detected by the steering torque sensor 173. As the steering angle becomes S1, the ratio gradually diminishes. When the steering angle approaches S2 and then becomes equal to or more than S2, the ratio becomes constant (R %).

Figure 7:
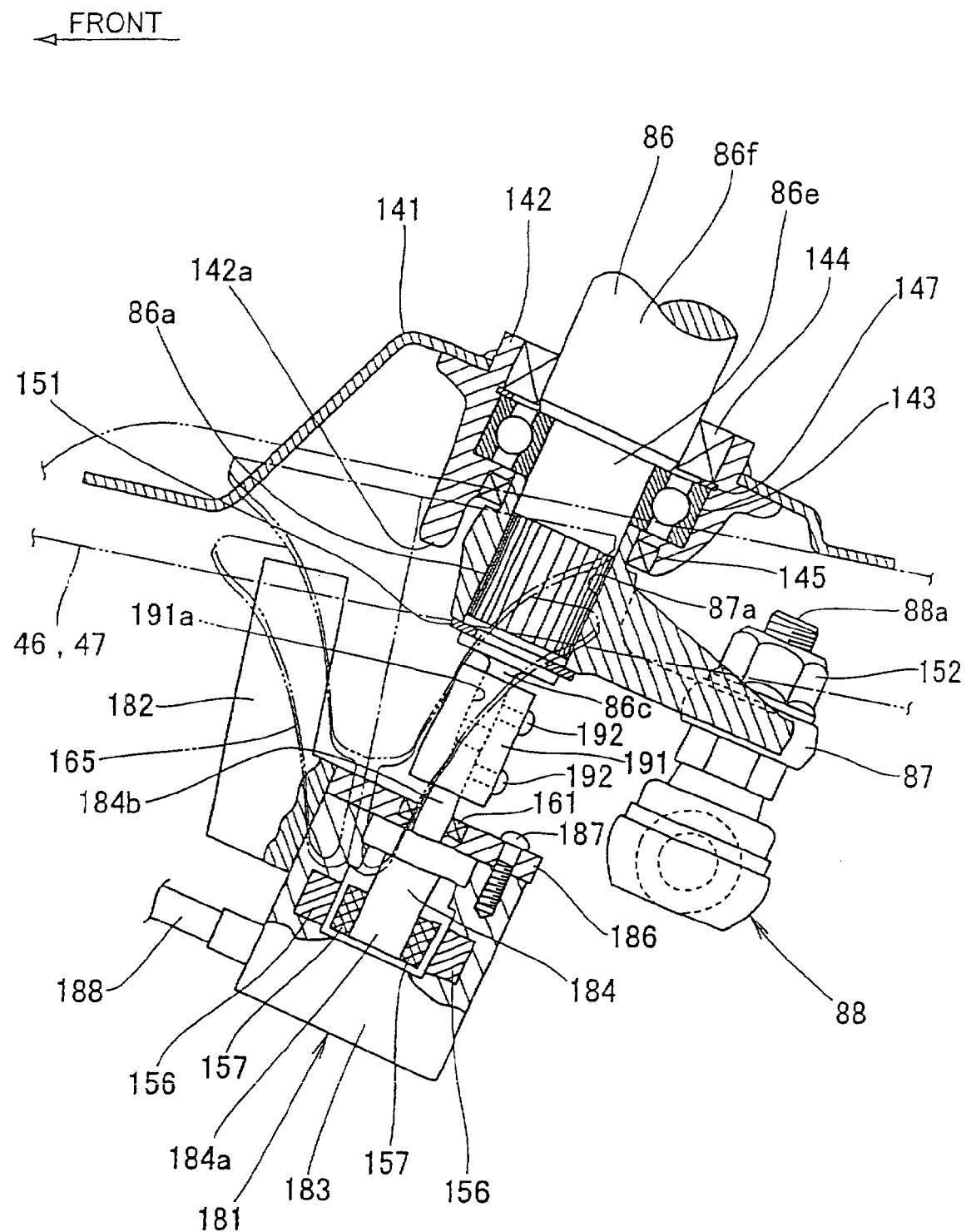
FIG. 7 is a cross-sectional view for illustrating another embodiment of the steering angle sensor according to the present invention.

FIG. 7 is a cross-sectional view for illustrating another embodiment of the steering angle sensor according to the present invention. Like parts are identified by the same reference numerals as in the embodiment of the present invention shown in FIG. 3 and descriptions therefore will be omitted.

A steering angle sensor 181 includes a housing 183, a plurality of detecting portions 156, a rotational shaft 184, a plurality of detected portions 157, a cover member 186, a sealing member 161, a plurality of screws 187, and a conducting wire 188. The housing 183 is supported by a bracket 182 mounted on sub-inclined frames 46, 47. The detecting portions 156 are mounted inside the housing 183. The rotational shaft 184 is rotatably inserted in the housing 183. The detected portions 157 are mounted on an outer peripheral surface of a leading end portion 184a of the rotational shaft 184. The cover member 186 plugs up an opening in the housing 183. The rotational shaft 184 penetrates through the cover member 186. The sealing member 161 seals a gap between the cover member 186 and the rotational shaft 184. The screws 187 secure the cover member 186 to the housing 183. The conducting wire 188 serves as an external lead for connecting a detection signal detected at the detecting portions 156 to a control portion 84 (see FIG. 2) or the like. A distal end portion 184b of the rotational shaft 184 is connected to a leading end portion 86c having a smaller diameter of an output shaft 86 via a coupling 191.

The rotational shaft 184 has an outside diameter (for example, the outside diameter of the leading end portion 184a or the outside of the distal end portion 184b of the rotational shaft 184) smaller than the outside diameter of an output shaft forming part of a steering shaft 38 (see FIG. 2) (for example, the outside diameter of a supported portion 86e supported by a bearing 143 or the outside diameter of a large diameter portion 86f formed on an upper portion of the supported portion 86e).

The coupling 191 is a member having a structure connecting the distal end portion 184b to a leading end portion 86c, in which the distal end portion 184b of the rotational shaft 184 inserted in a fitting hole 191a and the leading end portion 86c of the output shaft 86 are secured each with a screw 192, respectively.

As described above, the steering angle sensor 181 is connected to one end of the output shaft 86 via the coupling 191. This enhances application versatility of the steering angle sensor 181, since, for example, the need for connection of the steering angle sensor 181 to an output shaft having a leading end portion with an outside diameter different from the outside diameter of the leading end portion 86c calls for only replacement of the coupling 191 with one that fits with the leading end portion.

The steering angle sensor 181 may be removed for maintenance as follows. Specifically, the screws 187 are first removed to remove the cover member 186 from the housing 183. A bolt (not shown) for securing the housing 183 to the bracket 182 is then removed.

Disposing the steering angle sensor 181 on one end of the output shaft 86 as described above allows the steering angle sensor 181 to be removed or reinstalled easily.

Referring to FIG. 7, in this embodiment of the present invention, the steering angle sensor 181 is mounted at a leading end of the steering shaft 38, more specifically, the lower end portion or the leading end portion 86c of the output shaft 86 via the coupling 191.

The steering angle sensor 181 is mounted at the leading end portion 86c of the output shaft 86 via the coupling 191. Accordingly, even if, for example, the outside diameter and other shapes of the leading end portion 86c of the output shaft 86 vary according to a vehicle model, use of a coupling in accordance with the difference allows a general-purpose steering angle sensor 181 to be used regardless of the vehicle model involved. This contributes to reduction in cost.

In addition, the steering angle sensor 181 includes the rotational shaft 184 that rotates based on rotation of the output shaft 86 and the housing 183 that covers the outer periphery of the rotational shaft 184. The present invention is further characterized in that the rotational shaft 184 has an outside diameter (for example, the outside diameter of the leading end portion 184a or the outside of the distal end portion 184b of the rotational shaft 184) smaller than the outside diameter of the output shaft 86 (for example, the outside diameter of the supported portion 86e or the outside diameter of the large diameter portion 86f).

The arrangements, in which the steering angle sensor 181 includes the rotational shaft 184 and the housing 183 and the outside diameter of the rotational shaft 184 is made smaller than the outside diameter of the output shaft 86, help make the steering angle sensor 181 built compactly. If, for example, the steering angle sensor 181 includes a bearing for supporting the rotational shaft 184, therefore, the bearing can be made small.

In accordance with the embodiment of the present invention, the steering angle sensor 93 is disposed on the lower end of the steering shaft 38 as shown in FIGS. 2 and 3. The present invention is not limited to this arrangement; rather, it is perfectly appropriate that the steering angle sensor 93 be disposed on the upper end of the steering shaft 38. Referring to FIG. 1, only the handlebar 37 is mounted on the upper end of the steering shaft 38. The steering angle sensor 93 can therefore be removed or reinstalled in a large space available.

Referring to FIG. 7, the detected portions may also be disposed on the outer peripheral surface of the leading end portion 86c of the output shaft 86. In this case, the steering angle sensor 181 can be made smaller with a smaller number of component parts.

Power Supply Diagnostics Device

Next, with reference to FIGS. 8-12, the vehicle power supply diagnostics device of a vehicle with a steering assist mechanism will be described.

Figure 8:
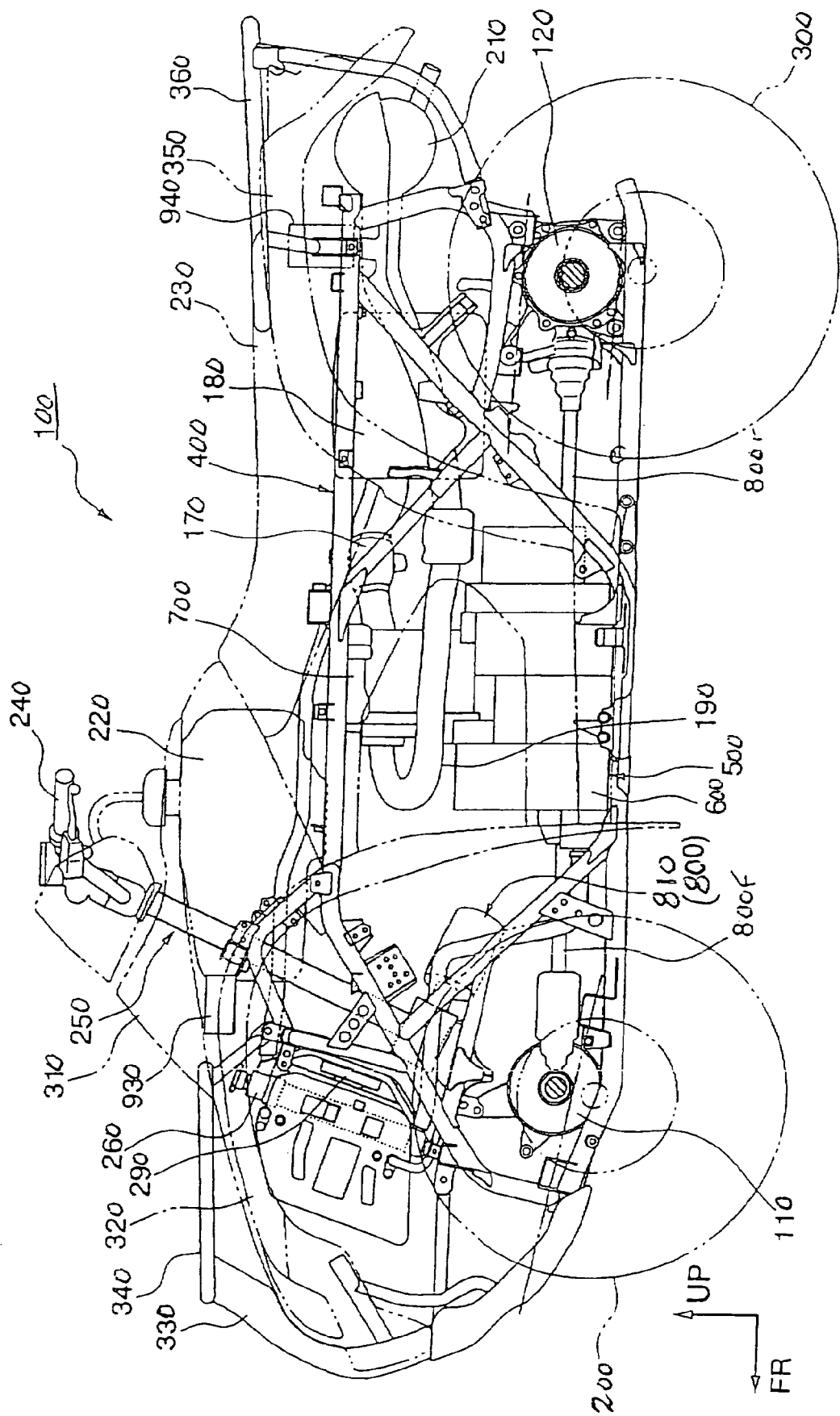
FIG. 8 is a side elevational view showing a saddle riding type four-wheeled vehicle to which the embodiment of the present invention have been applied.

A saddle riding type four-wheeled vehicle (vehicle) 100 shown in FIG. 8 is what is called an ATV (All Terrain Vehicle). The vehicle 100 includes right and left front wheels 200 and rear wheels 300 disposed at the front and the rear of a vehicle body constructed compactly and having a light weight, the wheels being low-pressure balloon tires having a relatively large diameter. The vehicle 100 has a relatively large minimum road clearance for mainly enhancing running performance on rough roads. A vehicle body frame 400 of the saddle riding type four-wheeled vehicle 100 is formed by welding or otherwise integrally connecting together steel stocks of a plurality of types. More specifically, right and left closed-loop structural bodies are connected together via a plurality of cross members. The vehicle body frame 400 is thus formed into a box structure having a longer length in a longitudinal direction at a central portion in a vehicle width direction.

An engine 500 as a power plant for the saddle riding type four-wheeled vehicle 100 is mounted substantially at a center of the vehicle body frame 400. The engine 500 is a water-cooled, single-cylinder engine. The engine 500 is what is called a longitudinal type, in which a rotary shaft of a crankshaft thereof runs along the front and rear direction of the vehicle. Propeller shafts 800f, 800r are extended forwardly and rearwardly, respectively, from a lower portion of the engine 500. The propeller shafts 800f, 800r are connected so as to permit power transmission to each of front wheels 200 and rear wheels 300, respectively, via a front reduction mechanism 110, a rear reduction mechanism 120, and the like, respectively, on an underside at a front portion and on an underside at a rear portion of the vehicle body frame 400. Each of the front wheels 200 and the rear wheels 300 is suspended via an independent type front suspension or rear suspension (not shown) at the front portion or the rear portion of the vehicle body frame 400.

In the engine 500, a throttle body 170 is connected to a rear portion of a cylinder portion 700 arranged in a standing condition on top of a crankcase 600. An air cleaner case 180 is connected to a rear portion of the throttle body 170. A proximal end portion of an exhaust pipe 190 is connected to a front portion of the cylinder portion 700. The exhaust pipe 190 extends forwardly of the cylinder portion 700 and then folds back rearwardly. A distal end portion of the exhaust pipe 190 is then connected to a silencer 210 disposed in the rear portion of the vehicle body.

A fuel tank 220 and a saddle riding type seat 230 are disposed, in that order from a front side, on an upper portion of the vehicle body of the saddle riding type four-wheeled vehicle 100 at the central portion in the vehicle width direction. In addition, there is disposed obliquely upwardly forward of the fuel tank 220 a handlebar 240 having grip portions on both right and left ends thereof. The handlebar 240 is secured to an upper end portion of a steering shaft 250 that extends linearly vertically. A battery (secondary battery) 940 as a vehicle power supply is disposed at a rear portion downwardly of the seat 230.

The steering shaft 250 is arranged inclined such that an upper portion thereof is disposed rearwardly. The fuel tank 220 is located immediately rearwardly of the upper portion of the steering shaft 250. The seat 230 is located immediately rearwardly of the fuel tank 220. The engine 500 is located rearwardly of a lower portion of the steering shaft 250 a predetermined distance away therefrom. A radiator 260 for cooling the engine 500 is disposed forwardly of the lower portion of the steering shaft 250. Reference numeral 290 represents an electrically-operated radiator fan.

A vehicle body cover 310, a front fender 320, a front protector 330, and a front carrier 340 are mounted on the front portion of the vehicle body frame 400. The vehicle body cover 310 made of plastic appropriately covers the front portion of the vehicle body. The front fender 320 made again of plastic covers the front wheels 200 from above and rearwardly. The front protector 330 and the front carrier 340 are made mainly of steel stocks. A rear fender 350 and a rear carrier 360 are mounted on a rear portion of the vehicle body frame 400. The rear fender 350 made of plastic covers the rear wheels 300 from above and forwardly. The rear carrier 360 is made mainly of steel stock.

Figure 9:
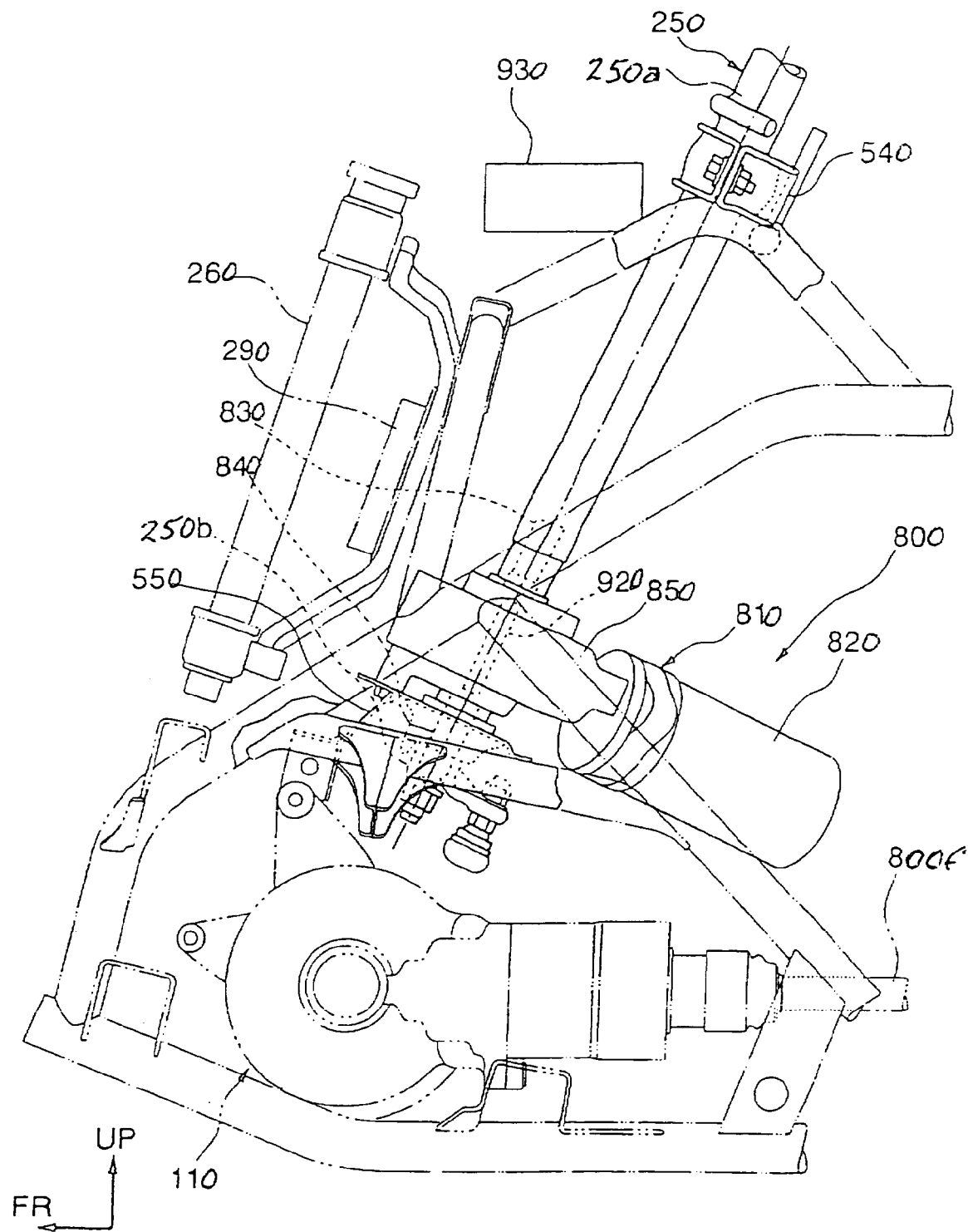
FIG. 9 is a side elevational view showing a front portion of a vehicle body of the saddle riding type four-wheeled vehicle.

Referring also to FIG. 9, in the front portion of the vehicle body frame 400, the upper portion and the lower end portion of the steering shaft 250 are supported by an upper portion support bracket 540 and a lower portion support bracket 550, respectively. The upper portion support bracket 540 and the lower portion support bracket 550 form the aforementioned cross members connecting the closed-loop structural bodies.

Herein, the saddle riding type four-wheeled vehicle 100 includes a motor-driven power steering system (a steering assist mechanism) 800 for lightening a handlebar operating force, namely, a front wheel steering force.

The power steering system 800 includes an actuator unit 810 and a control unit 930. The actuator unit 810 disposed at a middle portion of the steering shaft 250 is a type integrating a steering assist motor 820. The control unit 930 works as an ECU (Electric Control Unit) for controlling a drive of the steering assist motor (an electric power load part, electric motor) 820 based on a value detected by a torque sensor (not shown) inside the actuator unit 810.

The steering shaft 250 is divided into two parts, an upper portion shaft 250a and a lower portion shaft 250b, by the actuator unit 810 as a boundary therebetween. A lower end portion of the upper portion shaft 250*a* is connected coaxially with an input shaft 830 of the actuator unit 810. An upper end portion of the lower portion shaft 250*b* is connected coaxially with an output shaft 840 of the actuator unit 810. Each of the input shaft 830 and the output shaft 840 is connected, in a housing 850 of the actuator unit 810, to each other via a torsion bar 920 that forms part of the torque sensor.

The actuator unit 810 is located near a lower end portion of the steering shaft 250. The housing 850 of the actuator unit 810 is fastened to the lower portion support bracket 550 through a bolt or the like.

It is to be noted herein that contact resistance acts on each of the front wheels 200. When the handlebar 240 is operated clockwise or counterclockwise, therefore, a relative rotational force is produced between the input shaft 83 connected mechanically to the handlebar 240 and the output shaft 840 connected mechanically to each of the front wheels 200.

Torsion is produced at this time in the torsion bar 920 inserted between the input shaft 830 and the output shaft 840. A rotational torque applied to the steering shaft 250 based on the aforementioned torsion, namely, a steering torque of the handlebar 240 is detected. A signal corresponding to the detected torque value is applied to the control unit 930. The steering assist motor 820 is thereby controlled a drive based on the signal applied to the control unit 930.

Accordingly, when the handlebar 240 is rotationally operated, in addition to the rotating operating force from the handlebar 240, an assistive rotating force from the steering assist motor 820 is also given to the steering shaft 250 (the output shaft 840). This results in the handlebar operating force being lightened.

Figure 10:
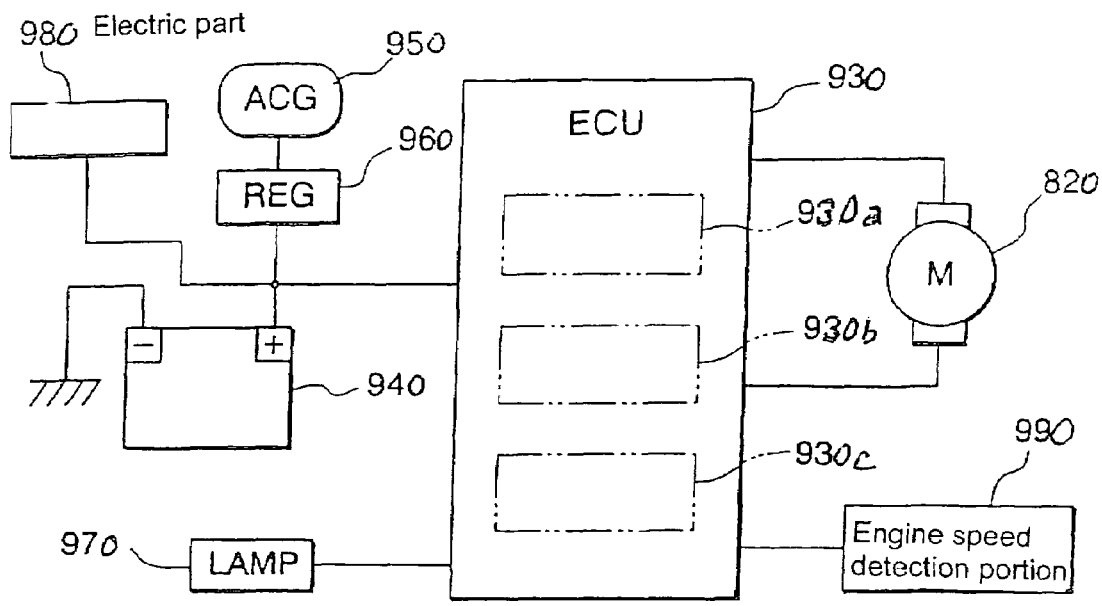
FIG. 10 is a block diagram showing a power supply diagnostics device in the saddle riding type four-wheeled vehicle.

FIG. 10 is a block diagram showing principal parts of a power supply diagnostics device in the saddle riding type four-wheeled vehicle 100. Referring to FIG. 10, an alternator (ACG, an alternating current generator) 950 of the saddle riding type four-wheeled vehicle 100 is connected to a battery 940 via a voltage regulator 960. The alternator 950 is also connected to electric parts 980 of various kinds such as a lighting apparatus and the like via the voltage regulator 960. The alternator 950 is further connected to the steering assist motor 820 via the voltage regulator 960 and the control unit 930.

An alternating current from the alternator 950 is smoothed and converted to a direct current by the voltage regulator 960. The voltage regulator 960 also regulates the output from the alternator 950 before the output is supplied for recharging the battery 940 and operating the electric parts 980 and the steering assist motor 820.

The alternator 950 is associated with the engine 500. As the engine 500 runs, the alternator 950 is driven to function a generator. In the meantime, the alternator 950 is driven by a supply voltage from the battery 940, thus functioning as an engine starter motor. Reference numeral 990 represents an engine speed detection portion detecting an engine speed Ne at all times.

Assume herein that there is developing what is called the open battery condition, in which the battery voltage is weak or a battery terminal is disconnected, thus causing the voltage supplied from the battery 940 to the electric parts to be in short supply or interrupted. In such an open battery condition, electric power is supplied to each of the electric parts in a condition, in which the voltage from the battery 940 is added to the voltage from the alternator 950, or in the form of only the voltage from the alternator 950.

Figure 11:
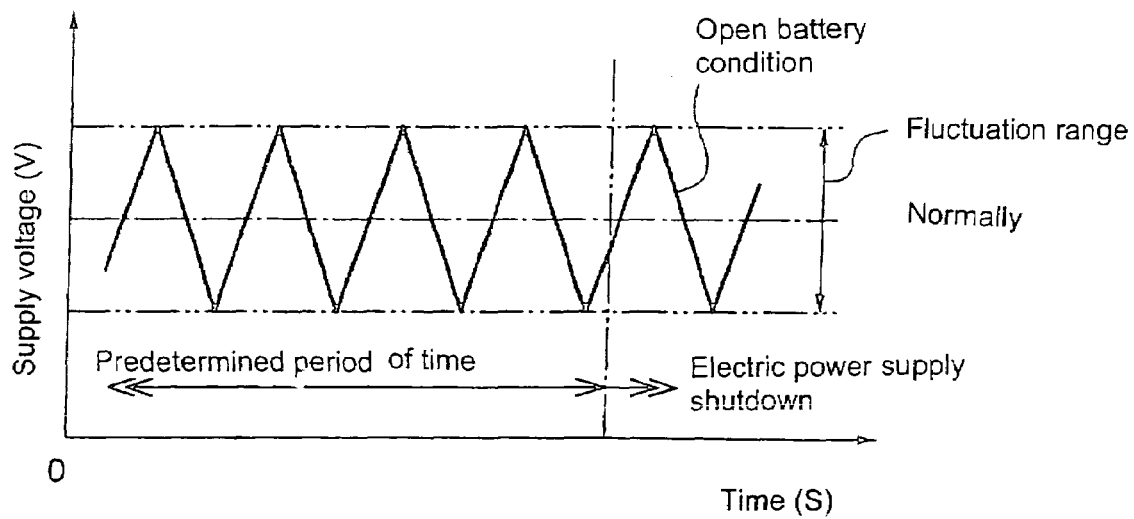
FIG. 11 is a graph showing a supply voltage to a control unit on the ordinate and time on the abscissa.
Figure 12:
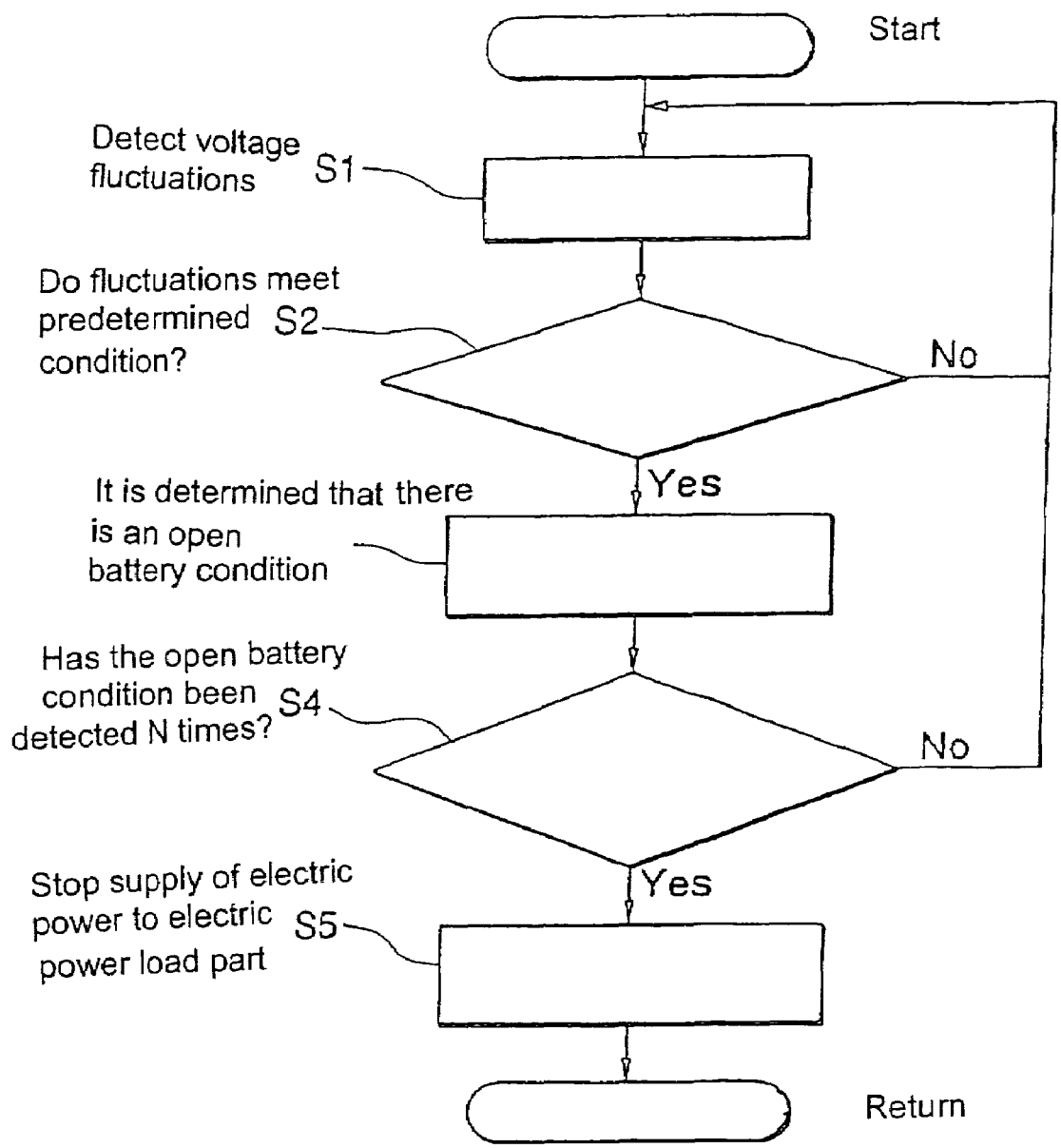
FIG. 12 is a flowchart showing an applied example of operations performed by the power supply diagnostics device.

Referring also to FIG. 11, the voltage supplied to the control unit 930 in the aforementioned open battery condition undergoes a relatively sizable increase and decrease as compared with a time when the battery voltage is sufficient (in a normal condition), during which the supply voltage remains substantially constant. This is due to an increase and decrease in the voltage supplied from the alternator 950 occupying a good or a substantial part of the supply voltage in accordance with the engine speed and the like. This results in fluctuations of a predetermined amount being produced in the supply voltage to the control unit 930.

The control unit 930 also adjusts the steering assist force by the steering assist motor 820 by controlling supply of electric power from the battery 940 or the alternator 950 to the steering assist motor 820 based on the detection signal and the like from the torque sensor.

The control unit 930 includes a voltage fluctuation detection portion (a voltage fluctuation detection section) 930*a*, an open battery determination portion (an open battery determination section) 930*b*, and an electric power supply shutdown portion (an electric power supply shutdown section) 930*c*. The voltage fluctuation detection portion 930*a* detects fluctuations in the supply voltage thereto (supply voltage to the steering assist motor 820). The open battery determination portion 930*b* determines whether there is an open battery condition or not based on results of detection made by the voltage fluctuation detection portion 930*a*. The electric power supply shutdown portion 930*c* shuts down supply of electric power to the steering assist motor 820 based on results of determination made by the open battery determination portion 930*b*.

The open battery determination portion 930*b* determines that there is developing the open battery condition when, for example, the following occurs. Specifically, assume that the voltage fluctuation detection portion 930*a* detects that the supply voltage to the steering assist motor 820 fluctuates so as to exceed a predetermined upper limit value and drop below a predetermined lower limit value and that the fluctuation meets a predetermined condition. Such a condition is, for example, that the voltage fluctuation detection portion 930*a* detects that the period of time, during which the supply voltage falls outside a fluctuation range between the upper limit value and the lower limit value, lasts a predetermined period of time or more.

At this time, the electric power supply shutdown portion 930*c* shuts down the supply of electric power to the steering assist motor 820 (that is, stop a steering assist control). At the same time, an alarm generating portion in the control unit 930 turns on an alarm lamp (an alarm section) 970 on a meter panel in the saddle riding type four-wheeled vehicle 100, warning an occupant of the saddle riding type four-wheeled vehicle 100 of the open battery condition. The control unit 930 resets the shutdown of the supply of electric power and turning on the alarm lamp 970 by turning off an ignition.

The predetermined condition allowing the open battery determination portion 930*b* to determine that there is developing the open battery condition may be met when the supply voltage exceeds the fluctuation range a predetermined number of times. The predetermined number of times may further be set to a value having correlation with the engine speed Ne outputted by the engine speed detection portion 990 (for example, a value that is directly proportional to the engine speed Ne).

As described in the foregoing, the power supply diagnostics device in the above embodiment of the present invention is applied to the saddle riding type four-wheeled vehicle 100, in which the electric power generated by the alternator 950 is supplied to the battery 940, from which the electric power is supplied to the steering assist motor 820. The power supply diagnostics device includes the voltage fluctuation detection portion 930*a*, the open battery determination portion 930*b*, and the electric power supply shutdown portion 930*c*. The voltage fluctuation detection portion 930*a* detects fluctuations in the supply voltage to the steering assist motor 820. The open battery determination portion 930*b* determines whether there is an open battery condition or not based on the results of detection made by the voltage fluctuation detection portion 930*a*. The electric power supply shutdown portion 930*c* shuts down supply of electric power to the steering assist motor 820 based on the results of determination made by the open battery determination portion 930*b*. The open battery determination portion 930*b* determines that there is developing the open battery condition when the aforementioned supply voltage fluctuates so as to exceed the predetermined upper limit value and drop below the predetermined lower limit value and that the fluctuation meets the predetermined condition. Based on the results of this determination, the electric power supply shutdown portion 930*c* shuts down the supply of electric power to the steering assist motor 820.

According to the arrangements made in this embodiment of the present invention, in the open battery condition of the saddle riding type four-wheeled vehicle 100, fluctuations in the supply voltage to the steering assist motor 820 occur when a ratio of the supply voltage from the alternator 950 becomes greater. When the fluctuations meet the predetermined condition, the supply of electric power to the steering assist motor 820 from the alternator 950 is shut down, or the steering assist control is otherwise stopped so that the supply of electric power to other electric parts 980 in the saddle riding type four-wheeled vehicle 100 can be secured.

Specifically, it is possible to suppress the amount of electric power consumed by the steering assist motor 820 in the open battery condition, thereby securing the supply of electric power to each of different electric parts 980 as a whole of the saddle riding type four-wheeled vehicle 100.

In addition, the power supply diagnostics device in the above embodiment of the present invention includes the alarm lamp 970 that warns the occupant of the saddle riding type four-wheeled vehicle 100 of the open battery condition. This allows the occupant of the saddle riding type four-wheeled vehicle 100 to be aware of the open battery condition. This enables easy and positive maintenance control of the saddle riding type four-wheeled vehicle 100.

In the power supply diagnostics device in the above embodiment of the present invention, the supply of electric power from the alternator 950 is performed via the voltage regulator 960. This allows the width of fluctuations in the supply voltage to each of different electric parts in the open battery condition to be set in accordance with the performance of the voltage regulator 960. Accordingly, each of the electric parts can be operated stably even in the open battery condition.

The present invention is not limited to the aforementioned embodiment and can be implemented in various manners. For instance, the supply of electric power to the steering assist motor 820 may be shut down through the processing shown in a flowchart shown in FIG. 12.

More specifically, the voltage fluctuation detection portion 930*a* detects fluctuations in the supply of electric power to the steering assist motor 820 (step S1). If the fluctuations meet at least one of the predetermined conditions (YES), the open battery determination portion 930*b* determines that there is developing the open battery condition (step S3). It is then determined whether or not the open battery condition has been detected the predetermined number of times (N times) (step S4). If it is determined at this time that the open battery condition has been detected less than N times (NO), the steps from step S1 are started over as it is when step S2 is answered NO. If it is determined that the open battery condition has been detected N times (YES), the electric power supply shutdown portion 930*c* shuts down the supply of electric power to the steering assist motor 820, thereby stopping the steering assist control.

As described in the foregoing, the supply of electric power to the steering assist motor 820 is shut down when the supply voltage repeats fluctuations meeting the predetermined conditions the predetermined number of times. Since this enhances accuracy in detecting the open battery condition, a shutdown of the supply of electric power to the steering assist motor 820 by false detection can be prevented.

Motor-Driven Power Steering Apparatus

Next, with reference to FIGS. 8 and 13-24, three embodiments of the motor-driven power steering apparatus using an assist motor will be described.

First Embodiment

The saddle riding type four-wheeled vehicle (vehicle) 100 illustrated in FIG. 8 was described above, so will not be repeated here.

Figure 13:
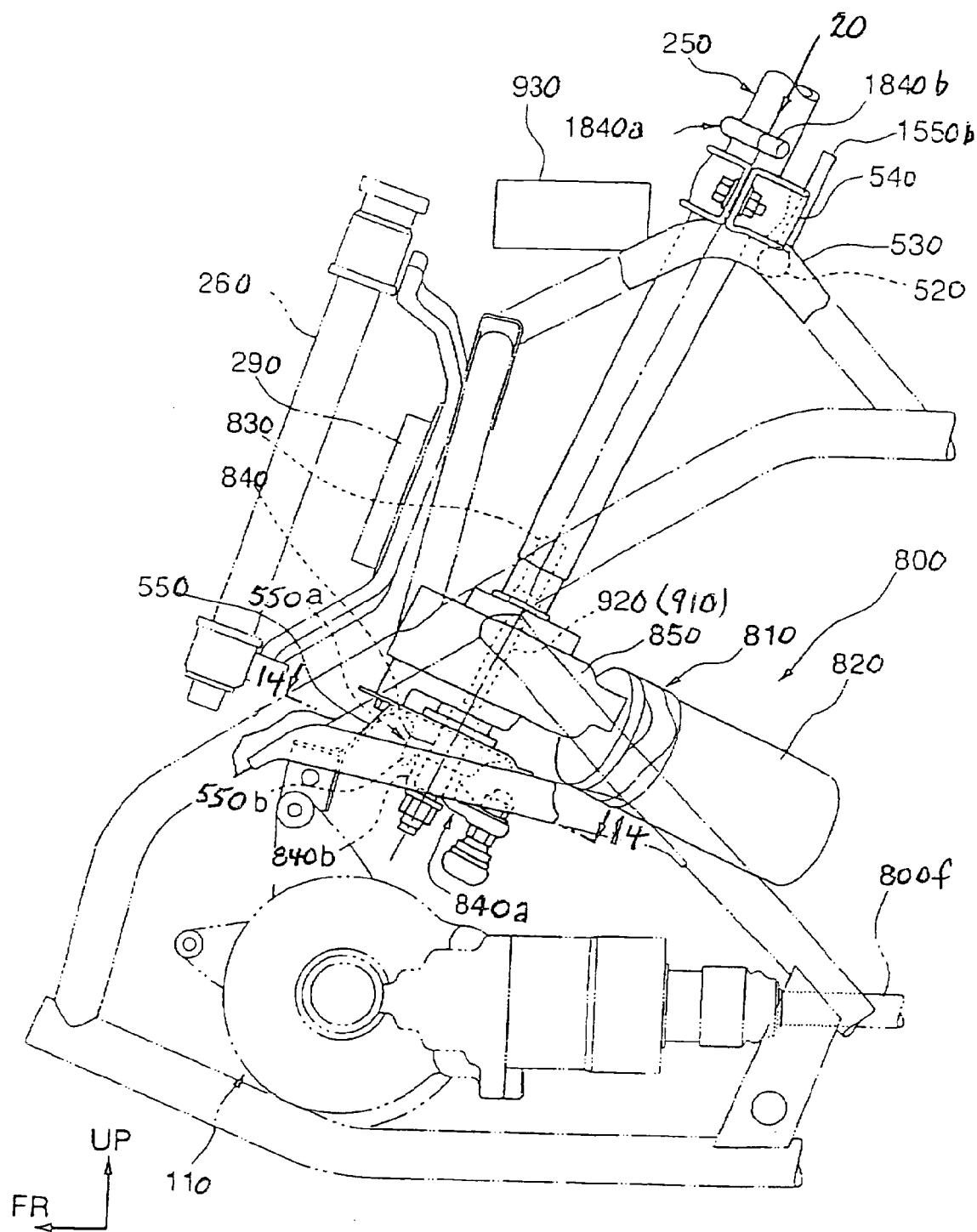
FIG. 13 is a side elevational view showing a front portion of a vehicle body of the saddle riding type four-wheeled vehicle.

FIG. 13 is similar to FIG. 9 and provides a side elevational view showing a front portion of a vehicle body of the saddle riding type four-wheeled vehicle. Elements described earlier will not be repeated.

Figure 14:
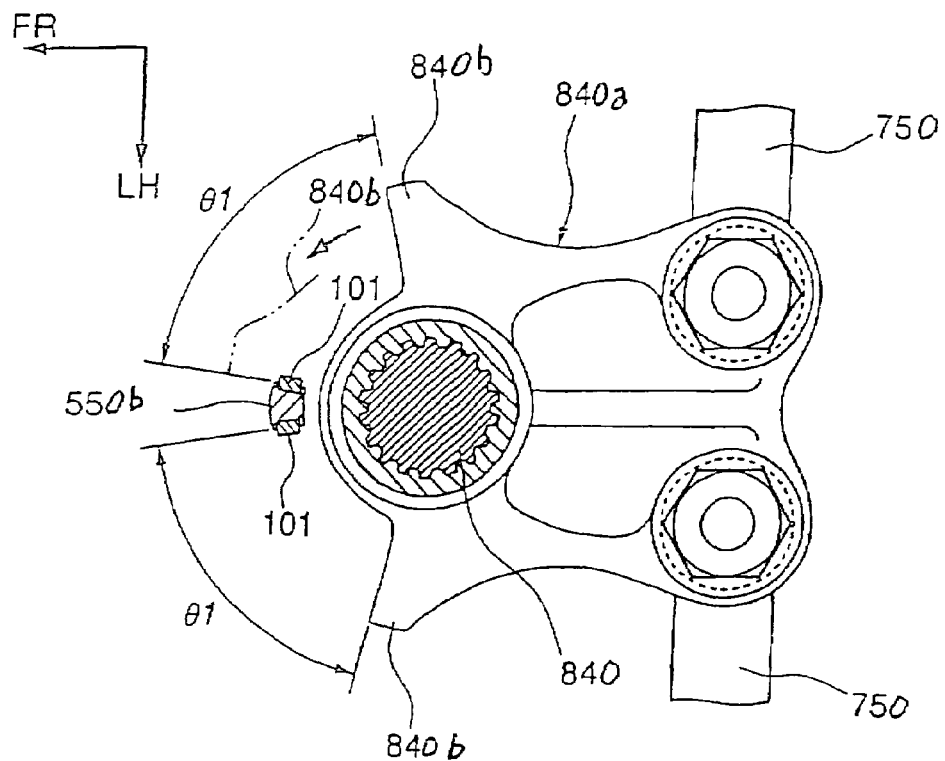
FIG. 14 is a cross-sectional view taken along line 14-14 of FIG. 13.

Referring FIGS. 13 and 14, the output shaft 840 of the actuator unit 810 is connected to the right and left front wheels 200 via right and left tie rods 750, respectively. A pitman arm 84*a* engaging an inner side end of each of the tie rods 750 is mounted to the output shaft 840 through a spline fit.

The pitman arm 840*a* is located immediately downward of the lower portion support bracket 550. The pitman arm 840*a* and a shaft holder 550*a* secured to the lower portion support bracket 550 constitute a handlebar stopper that defines the maximum turning position in the clockwise or counterclockwise direction of the handlebar 240 (steering shaft 250).

More specifically, a stopper main body 550*b* is disposed on a lower side of the shaft holder 550*a* in a protruding condition. The pitman arm 840*a* includes right and left abutment portions 840*b* disposed in a protruding condition on both side thereof. When the handlebar 240 is turned through a predetermined angle (θ1 in FIG. 14) either clockwise or counterclockwise from a state of 0° turning angle (vehicle in a condition of traveling in a straight ahead direction), either the right or left abutment portion 840*b* abuts on a side portion of the stopper main body 550*b*. This sets the handlebar 240 in a state of being restricted from turning more at the maximum turning position. The stopper main body 550*b* includes maximum turning switches (maximum turning detection means) 101 for detecting the maximum clockwise and counterclockwise turning, respectively, of the handlebar 240. The maximum turning switches may, for example, be disposed on both sides of the stopper main body 550*b*.

Figure 20:
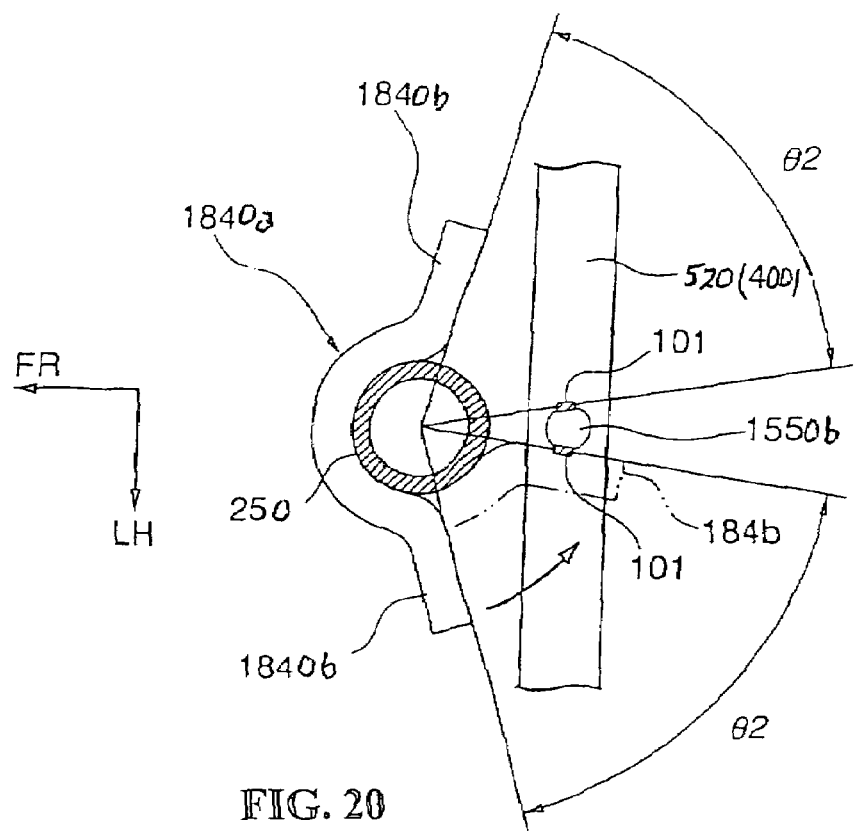
FIG. 20 is a view on arrow 20 of FIG. 13, illustrating another embodiment of a handlebar stopper.

Another embodiment of the handlebar stopper will be described with reference to FIGS. 13 and 20. The vehicle body frame 400 includes right and left top pipes 530 disposed at a front portion on an upper side thereof. The right and left top pipes 530 are substantially downwardly opened V shape in a side view. The upper portion support bracket 540 is placed across apexes (which are also a topmost portion of the vehicle body frame 400) of the two top pipes 530. There is also disposed a cross pipe 520 immediately behind the upper portion support bracket 540 across both top pipes 530. A bar-like stopper main body 1550b is welded and secured to a center of an upper portion of the cross pipe 520 in a standing condition. In addition, a bar stock 1840a is welded and secured to the steering shaft 250 immediately forward of the stopper main body 155b. The bar stock 1840a is bent at a center portion thereof along an outer periphery of the steering shaft 250.

Both side portions of the bar stock 1840a form right and left abutment portions 1840b. When the handlebar 240 is turned through a predetermined angle (θ2 in FIG. 20) either clockwise or counterclockwise from a state of 0° turning angle, either the right or left abutment portion 1840b abuts on a side portion of the stopper main body 1550b. This sets the handlebar 240 in a state of being restricted from turning more at the maximum turning position. The handlebar stopper having arrangements as described above also includes maximum turning switches 101 that may, for example, be disposed on both sides of the stopper main body 1550b.

Figure 15:
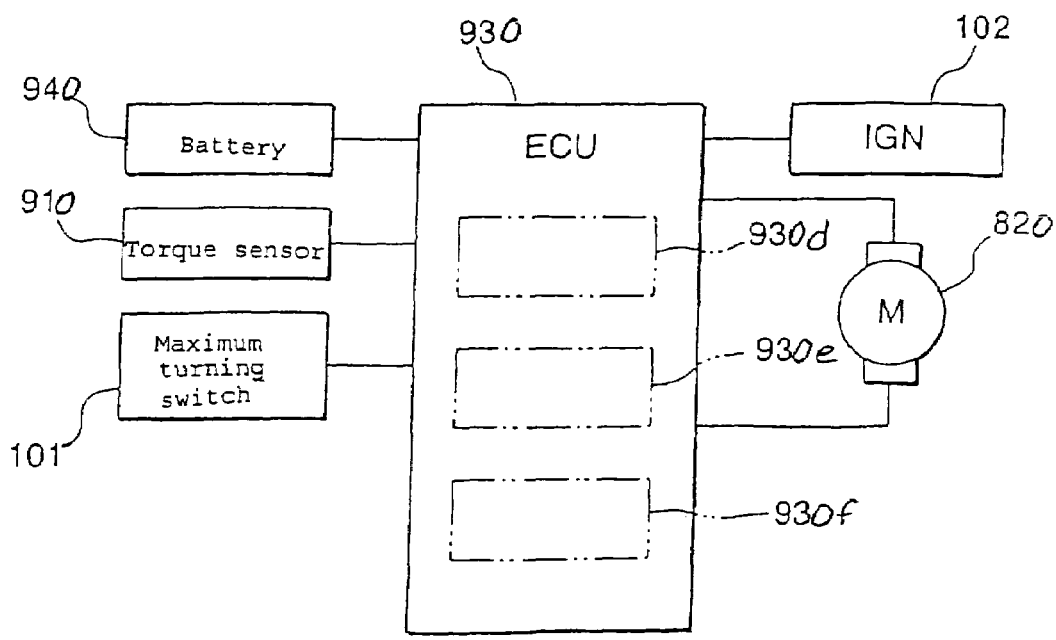
FIG. 15 is a block diagram showing a steering assist force control unit in the saddle riding type four-wheeled vehicle.

FIG. 15 is a block diagram showing principal parts of a steering assist force control unit in the first embodiment of the present invention. A maximum turning detection signal is inputted to the control unit 930 from the maximum turning switch 101 disposed in the stopper main body 550b (or the stopper main body 1550b). Based on this maximum turning detection signal, and a voltage value and a current value applied to the power assist motor 820, the control unit 930 detects the turning angle of the steering shaft 250. The control unit 930 further incorporates this turning angle for controlling the steering assist force to the steering shaft 250.

More specifically, the control unit 930 includes a turning angle calculation portion (turning angle calculation means) 930d, a reference position estimation portion (reference position calculation means) 930e, and a steering force control portion 930f. The turning angle calculation portion 930d calculates a relative turning angle (a turning angle from any arbitrary position) of the steering shaft 250. The reference position estimation portion 930e estimates a turning reference position (a turning reference state relative to the vehicle body) of the steering shaft 250 based on the detection signal provided by the maximum turning switch 101. The steering force control portion 930f varies the steering assist force based on an absolute steering angle (a relative turning angle from the steering reference position) of the steering shaft 250 known from the relative turning angle and the turning reference position).

An example of processing executed in this control unit 930 will be described with reference to a flowchart shown in FIG. 16. It is first determined whether or not an ignition 102 is ON (whether the engine is started or not) (step S1). If it is determined that the ignition 102 is ON (YES), the turning angle calculation portion 930d calculates the relative turning angle of the steering shaft 250 (step S2) and the reference position estimation portion 930e estimates the turning reference position (step S3). Based on the absolute turning angle known from the relative turning angle and the turning reference position, the steering force control portion 930f provides control so as to vary the steering assist force for the steering shaft 250 (step S4).

Specifically, the power assist motor 820 generating the steering assist force is drivingly controlled by not only the steering torque detection signal from the torque sensor 910, but also the absolute turning angle of the steering shaft 250 incorporated therein. This enables finely-tuned control as detailed in the following. Specifically, for example, an output torque of the power assist motor 820 (steering assist force) is varied between when the handlebar 240 is turned from a position, at which the absolute turning angle of the steering shaft 250 (the handlebar 240) is 0° (vehicle in a condition of traveling in a straight-ahead direction), and when the handlebar 240 is turned back to the 0° position. This improves steering performance and the degree of freedom in designing the ratio of the steering mechanism.

Figure 17:
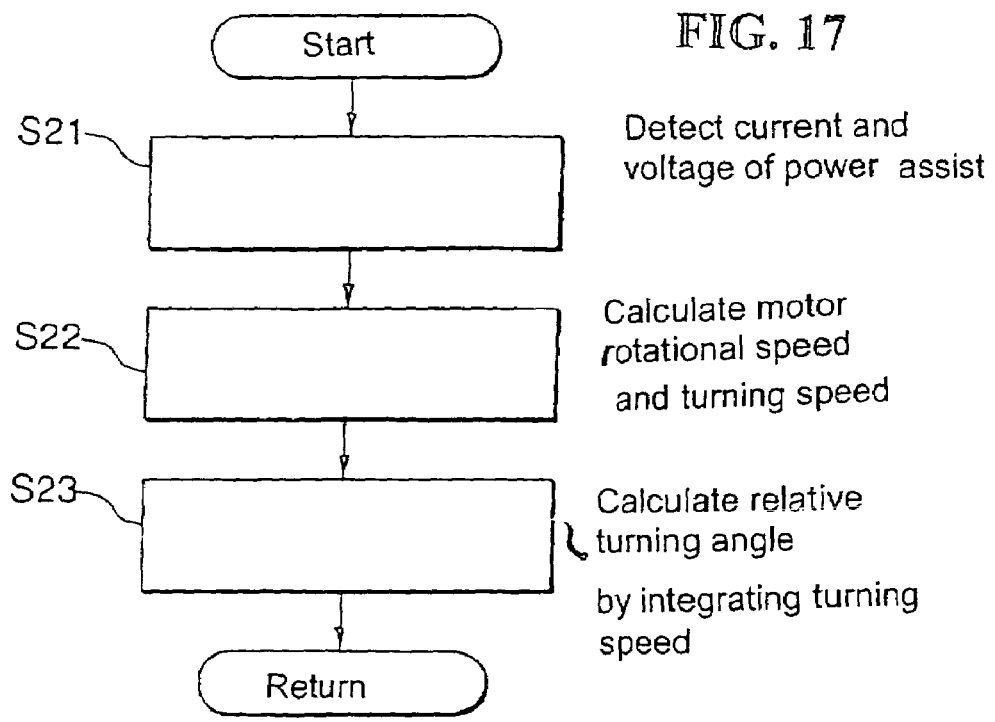
FIG. 17 is a flowchart showing operations performed for calculating a relative turning angle in the flowchart shown in FIG. 16.

The processing performed by the turning angle calculation portion 930d for calculating the relative turning angle in step S2 will be described with reference to a flowchart shown in FIG. 17. The turning angle calculation portion 930d first detects current and voltage of the power assist motor 820 (step S21). Based on the detected values, the turning angle calculation portion 930d calculates a rotational speed of the power assist motor 820 (a motor rotational speed) and, by incorporating a reduction ratio and the like of the actuator unit 810 to this motor rotational speed, calculates a turning speed of the steering shaft 250 (step S22). The turning angle calculation portion 930d thereafter integrates the turning speed to calculate the relative turning angle of the steering shaft 250 (step S23).

Figure 18:
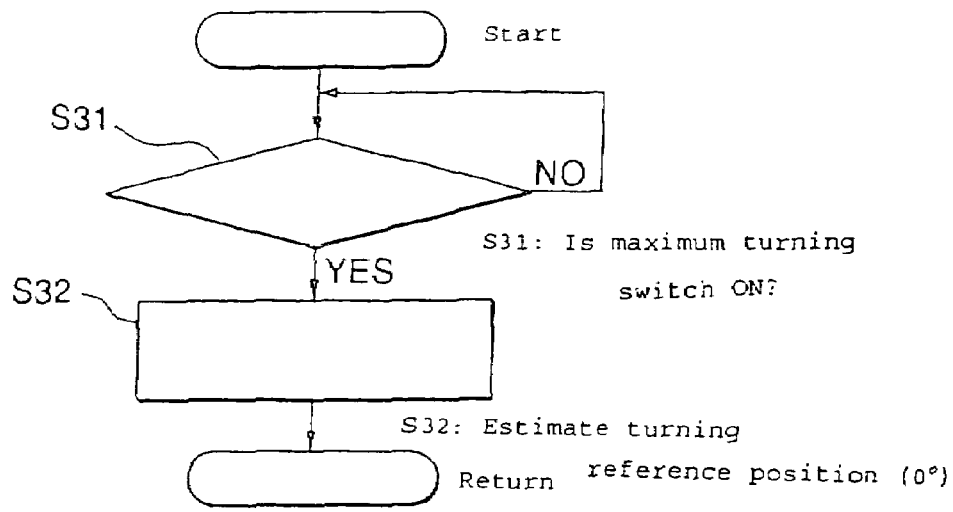
FIG. 18 is a flowchart showing operations performed for estimating a turning reference position in the flowchart shown in FIG. 16.

The processing performed by the reference position estimation portion 930e for estimating the turning reference position in step S3 will be described with reference to a flowchart shown in FIG. 18. The reference position estimation portion 930e first determines whether or not either of the maximum turning switches 101 is turned ON (whether the maximum turning is detected or not) (step S31). If it is determined that either of the maximum turning switches 101 has been turned ON (the maximum turning has been detected) (YES), the operation proceeds as follows. Specifically, by knowing the absolute turning angle of the steering shaft 250 set to a predetermined angle, the reference position estimation portion 930e calculates back the position, at which the absolute turning angle of the steering shaft 250 becomes 0°, which is estimated as the turning reference position (step S32).

The reference position estimation portion 930e is yet to estimate the turning reference position at any timing immediately following the ignition turned ON or the like. During such timings, the steering force control portion 930f provides a type of control that does not incorporate the turning angle until an estimated turning reference position becomes available. When the turning reference position is yet to be estimated, the steering force control portion 930f may use a predetermined default value read from a memory of the control unit 930. Specifically, the absolute turning angle of the steering shaft 250 when the ignition is turned OFF is fixed or assumed for use as the default value or the absolute turning angle of the steering shaft 250 immediately before the ignition is turned OFF is stored in memory for use as the default value.

It is to be noted herein that, in step S4, when varying the output torque of the power assist motor 820 based on the absolute turning angle of the steering shaft 250, the steering force control portion 930f multiplies a target value of the output torque of the power assist motor 820 based on the detection signal of the torque sensor 910 by a predetermined ratio that varies according to the absolute turning angle.

Figure 19:
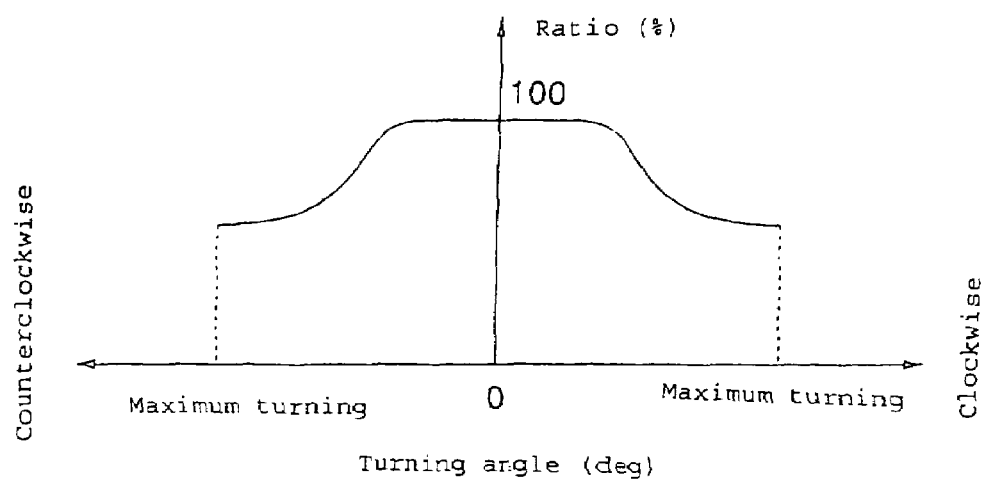
FIG. 19 is a graph showing a ratio, by which a target value of an output torque of a power assist motor is multiplied, on the ordinate and a turning angle on the abscissa.

More specifically, referring to FIG. 19, while the absolute turning angle of the steering shaft 250 remains relatively small, a good steering feel in a practical steering range is achieved by maintaining substantially constant a condition of multiplying the target value of the output torque of the power assist motor 820 by a ratio of 100%. When the absolute turning angle becomes relatively large, the ratio is reduced to a value less than 100% and, by multiplying the target value by the ratio, the output torque of the power assist motor 820 is reduced. A steering returnability by a road surface reaction is thereby emphasized.

A ratio of the absolute turning angle of the handlebar 240 to the absolute turning angle of the front wheels 200 (a steering ratio) varies according to the absolute turning angle of the handlebar 240 because of restrictions imposed by a vehicle layout. For example, there is produced a difference in a steering load (a handlebar steering force) between when the handlebar 240 is positioned at an angle corresponding to a neutral position and when the handlebar 240 is positioned at an angle corresponding to the maximum turning position. In the power steering system 800, the difference in the steering load can be increased or decreased for setting an optimum steering feel by controlling the steering assist force in accordance with the absolute turning angle. A change in the steering load as a result of a change in the steering ratio can be adjusted with the assist control of the power steering system 800. This widens the width of permissible steering ratio variations, which, in turn, enhances the degree of freedom in designing areas around the steering.

As described in the foregoing, the motor-driven power steering apparatus according to the first embodiment of the present invention uses the power assist motor 820 as the driving source for giving the steering mechanism the steering assist force. The power steering apparatus includes the turning angle calculation portion 930*d*, the reference position estimation portion 930*e*, and the maximum turning switches 101. The turning angle calculation portion 930*d* detects the motor rotational speed based on the voltage and current of the power assist motor 820 and calculates the relative turning angle of the steering shaft 250 by integrating the motor rotational speed (the turning speed). The reference position estimation portion 930*e* estimates the turning reference position of the steering shaft 250 based on movement of the steering shaft 250. The maximum turning switches 101 detect the maximum turning of the steering shaft 250. The reference position estimation portion 930*e* estimates, as the turning reference position of the steering shaft 250, the position, at which the absolute turning angle of the steering shaft 250 becomes 0° when the maximum turning switch 101 detects the maximum turning of the steering shaft 250.

According to the arrangements made in the first embodiment of the present invention, knowing the relative turning angle of the steering shaft 250 and the turning reference position of the steering shaft 250 allows the relative turning angle from the turning reference position, that is, the absolute turning angle of the steering shaft 250 to be detected.

This enables finely-tuned control of the steering assist force with a parameter of the steering angle of the steering shaft 250 incorporated. It is further possible to reduce cost and weight by eliminating the need for any dedicated steering angle sensor or fail-safe measures, or the like. In addition, the change in the steering load occurring from the relation between the steering position and the steering ratio can be adjusted with the assist control of the power steering system 800. This allows the steering ratio in each of the varying steering positions to be set without having to consider the steering load change. The degree of freedom in designing the area around the steering is thereby increased.

Second Embodiment

A second embodiment of the present invention will be described. The second embodiment of the present invention differs from the first embodiment of the present invention in the arrangement of the steering assist force control unit and the processing performed for estimating the steering reference position of a steering shaft 250. Like parts are identified by the same reference numerals as in the first embodiment of the present invention and descriptions therefore will be omitted.

Figure 21:
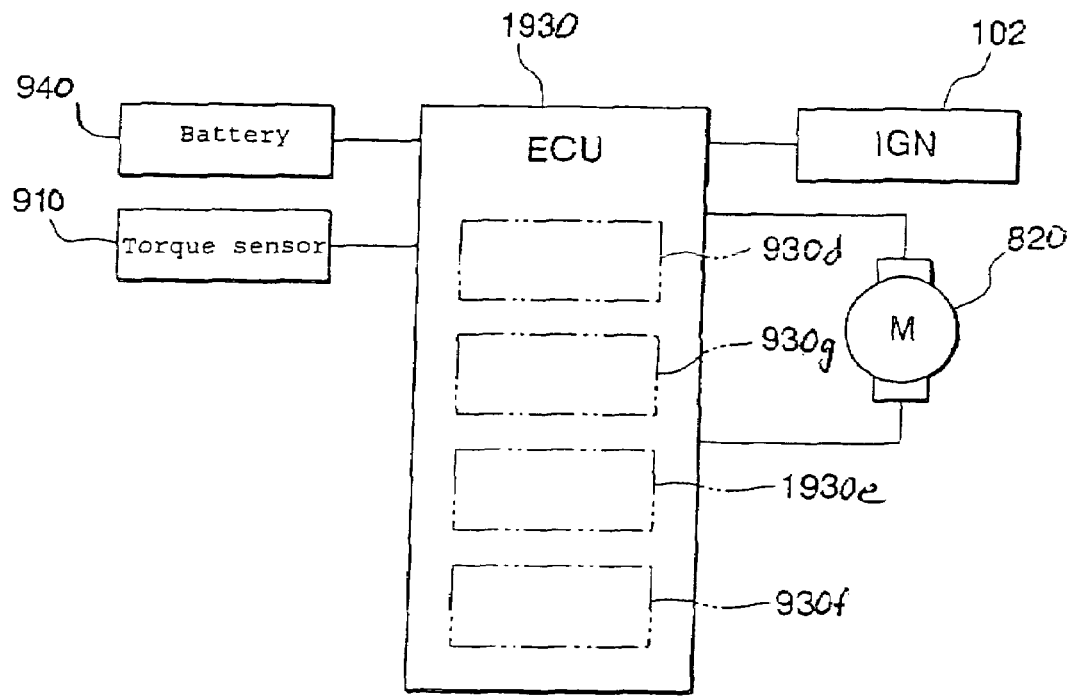
FIG. 21 is a block diagram showing a steering assist force control unit according to a second embodiment of the present invention.

FIG. 21 is a block diagram showing principal parts of a steering assist force control unit in the second embodiment of the present invention. As shown in FIG. 21, a control unit 1930 to take the place of the control unit 930 in the first embodiment of the present invention detects the steering angle of the steering shaft 250 based on a cumulative value of the relative steering angle and, by incorporating the detected steering angle, controls the steering assist force for the steering shaft 250.

More specifically, the control unit 1930 includes a turning angle calculation portion 930*d*, a turning angle accumulation portion 930*g*, a reference position estimation portion (reference position calculation means) 1930*e*, and a steering force control portion 930*f*. The turning angle calculation portion 930*d* calculates the relative turning angle of the steering shaft 250. The turning angle accumulation portion 930*g* accumulates the calculated value of the turning angle calculation portion 930*d* to detect a variation width of the relative turning angle. The reference position estimation portion 1930*e* estimates the turning reference position of the steering shaft 250 when the detection value of the turning angle accumulation portion 930*g* reaches a predetermined value. The steering force control portion 930*f* varies the steering assist force based on the absolute turning angle of the steering shaft 250 known from the relative turning angle and the turning reference position.

Figure 16:
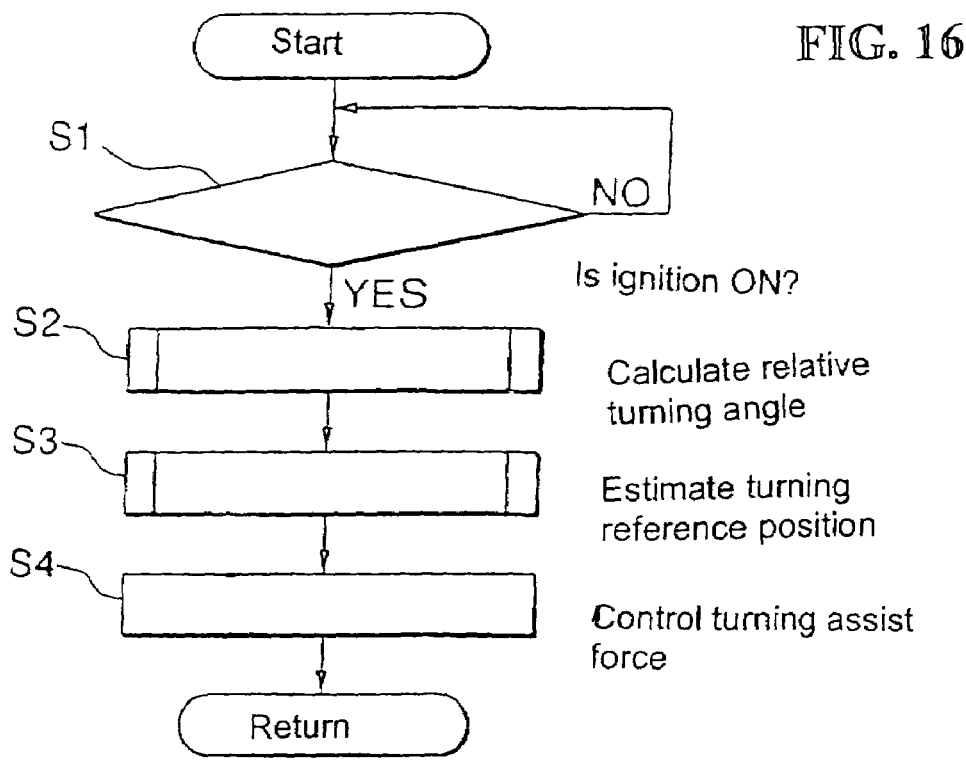
FIG. 16 is a flowchart showing operations performed by the steering assist force control unit.

When the processing shown in the flowchart shown in FIG. 16 is executed in the control unit 1930 having arrangements as described above, control is provided to vary the steering assist force based on the absolute turning angle of the steering shaft 250. The specific operation performed in step S3 (processing for estimating the turning reference position of the steering shaft 250) according to the second embodiment of the present invention, however, differs from that performed in step S3 according to the first embodiment of the present invention.

Figure 22:
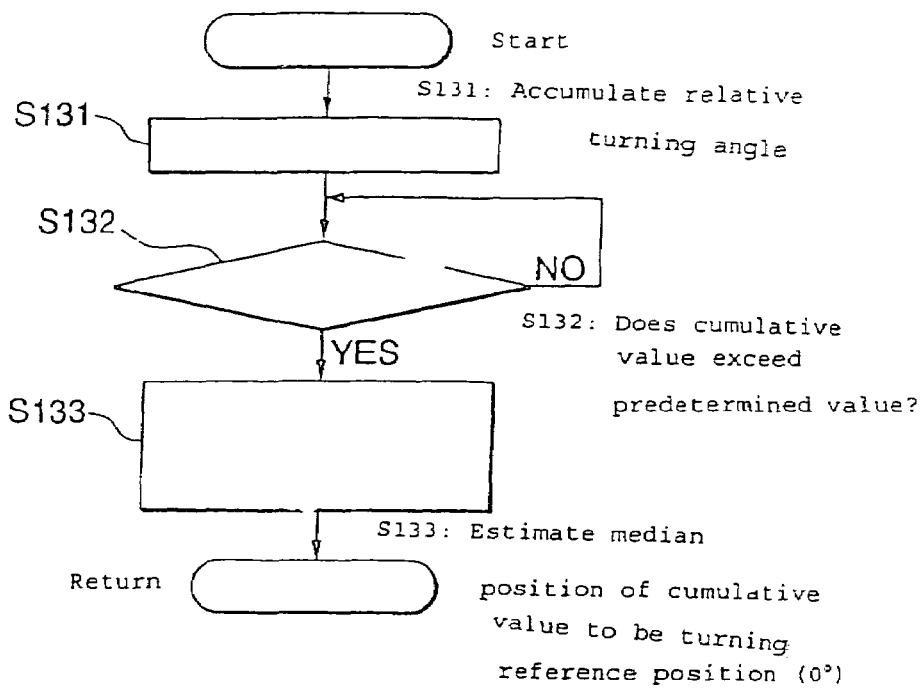
FIG. 22 is a flowchart showing operations performed in the second embodiment of the present invention corresponding to FIG. 18.

More specifically, referring to a flowchart shown in FIG. 22, the relative turning angle of the steering shaft 250 is first accumulated (step S131). It is then determined whether or not the cumulative value (which corresponds to the amount of variation in the relative turning angle between a clockwise turning end and a counterclockwise turning end) has reached the predetermined value (step S132). The predetermined value corresponds to the amount of variation between the maximum turning of the steering shaft 250 in the clockwise direction and that in the counterclockwise direction. More specifically, the predetermined value is slightly smaller than the amount of variation between the maximum turning of the steering shaft 250 in the clockwise direction and that in the counterclockwise direction.

If it is determined that the cumulative value has reached the predetermined value (YES), a median position of the cumulative value (at which the absolute turning angle is 0°) is then estimated to be the turning reference position (step S133). The reason why the predetermined value is set to a value slightly smaller than the amount of variation between the maximum turning of the steering shaft 250 in the clockwise direction and that in the counterclockwise direction is because of the following reason. Specifically, detection sensitivity is enhanced by allowing the system to estimate the turning reference position before the steering shaft 250 is turned fully clockwise or counterclockwise.

As described in the foregoing, the motor-driven power steering apparatus according to the second embodiment of the present invention includes the turning angle calculation portion 930*d*, the turning angle accumulation portion 930*g*, and the reference position estimation portion 1930*e*. The turning angle calculation portion 930*d* calculates the relative turning angle of the steering shaft 250. The turning angle accumulation portion 930*g* detects the variation width of the relative turning angle. The reference position estimation portion 1930*e* estimates the turning reference position of the steering shaft 250 based on movement of the steering shaft 250. When the variation width of the relative turning angle of the steering shaft 250 reaches a predetermined value, the reference position estimation portion 1930*e* estimates the turning reference position of the steering shaft 250.

According to the arrangements made in the second embodiment of the present invention, the variation width of the relative turning angle of the steering shaft 250 reaches the predetermined value, it is now possible to find the absolute turning angle of the steering shaft 250 at the clockwise turning end and at the counterclockwise turning end of the variation width. Based on the known absolute turning angles, it becomes possible to estimate the turning reference position of the steering shaft 250 and detect the absolute turning angle of the steering shaft 250.

Even without the maximum turning switches 101 as in the first embodiment of the present invention, the second embodiment of the present invention enables finely-tuned control of the steering assist force incorporating the parameter of the steering angle of the steering shaft 250, while achieving reduction in cost and weight by eliminating the need for the dedicated steering angle sensor or fail-safe measures Third Embodiment Next, a third embodiment of the present invention will be described.

The third embodiment of the present invention differs from each of the first and the second embodiments of the present invention in the arrangement of the steering assist force control unit and the processing performed for estimating the steering reference position of a steering shaft 250. Like parts are identified by the same reference numerals as in the first and second embodiments of the present invention and descriptions therefore will be omitted.

Figure 23:
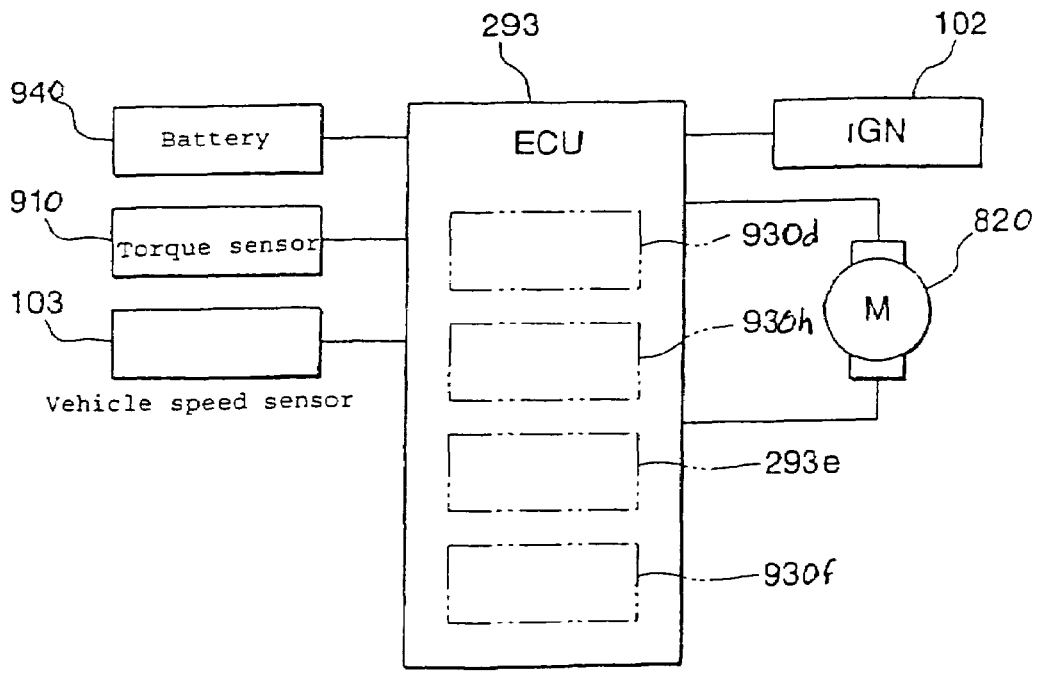
FIG. 23 is a block diagram showing a steering assist force control unit according to a third embodiment of the present invention.

FIG. 23 is a block diagram showing principal parts of a steering assist force control unit in the third embodiment of the present invention. As shown in FIG. 23, a control unit 293 to take the place of the control units 930 and 1930 in the first and second embodiments of the present invention controls the steering assist force for the steering shaft 250 as follows. Specifically, receiving a detection signal from a vehicle speed sensor (vehicle speed detection means) 103 for detecting a vehicle speed of a saddle riding type four-wheeled vehicle 100, the control unit 293 detects the turning angle of the steering shaft 250 based on the vehicle speed detection signal and a steering torque detection signal from a torque sensor 910. The control unit 293 then incorporates the turning angle for controlling the steering assist force for the steering shaft 250.

More specifically, the control unit 293 includes a turning angle calculation portion 930*d*, a straight ahead condition detection portion 930*h*, a reference position estimation portion (reference position calculation means) 293*e*, and a steering force control portion 930*f*. The turning angle calculation portion 930*d* calculates the relative turning angle of the steering shaft 250. The straight ahead condition detection portion 930*h* detects a straight ahead condition of the saddle riding type four-wheeled vehicle 100 based on the detection values of the vehicle speed sensor 103 and the torque sensor 910. The reference position estimation portion 293*e* estimates the turning reference position of the steering shaft 250 when the straight ahead condition detection portion 930*h* detects the straight ahead condition of the saddle riding type four-wheeled vehicle 100. The steering force control portion 930*f* varies the steering assist force based on the absolute turning angle of the steering shaft 250 known from the relative turning angle and the turning reference position.

When the processing shown in the flowchart shown in FIG. 16 is executed in the control unit 293 having arrangements as described above, control is provided to vary the steering assist force based on the absolute turning angle of the steering shaft 250. The specific operation performed in step S3 (processing for estimating the turning reference position of the steering shaft 250) according to the third embodiment of the present invention, however, differs from that performed in step S3 according to the first and second embodiments of the present invention.

Figure 24:
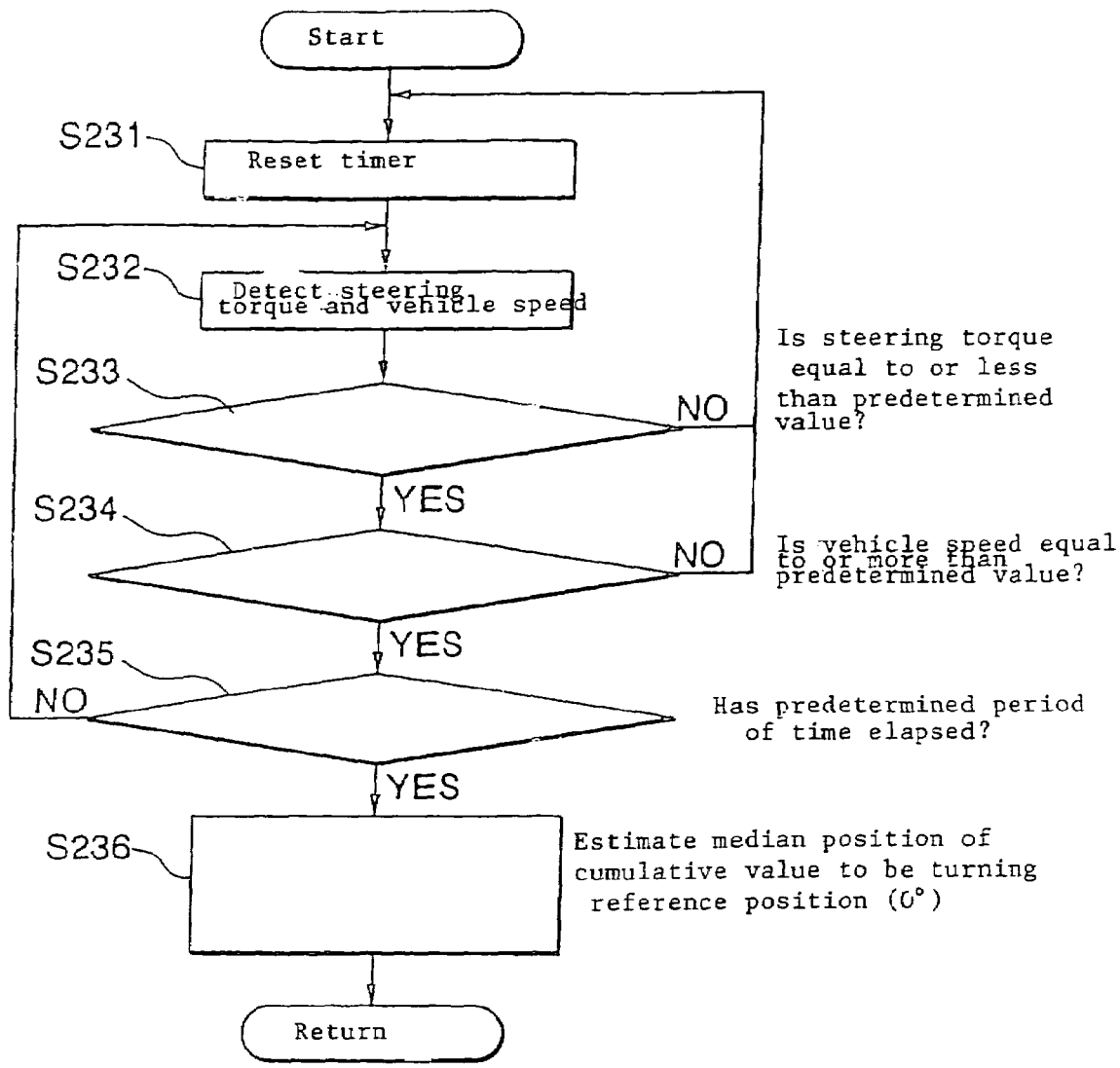
FIG. 24 is a flowchart showing operations performed in the third embodiment of the present invention corresponding to FIG. 18.

More specifically, referring to a flowchart shown in FIG. 24, a timer in the control unit 293 is reset (step S231) and detection of the vehicle speed and the steering torque is started (step S232). It is then determined whether or not the steering torque equals to, or less than, a predetermined value (step S233). If it is determined in step S233 that the steering torque is equal to or less than the predetermined value (YES), it is then determined whether or not the vehicle speed is equal to or more than a predetermined value (step S234). If it is determined in step S234 that the vehicle speed is equal to or more than the predetermined value (YES), it is then determined whether or not a predetermined period of time has elapsed after the timer reset (step S235).

If it is determined in step S235 that the predetermined period of time has elapsed (that is, if a condition, in which the steering torque is equal to or less than the predetermined value and the vehicle speed is equal to or more than the predetermined value, continues to exist for the predetermined period of time), it is estimated that the saddle riding type four-wheeled vehicle 100 is in the straight ahead condition. Then, a position of the steering shaft 250 in the straight ahead condition found by, for example, averaging the relative turning angle within the predetermined period of time or through other operation (a position, at which the absolute turning angle is 0°) is estimated as the turning reference position (step S236). If it is determined in step S235 that the predetermined period of time is yet to be elapsed (NO), operations from step S232 and onward are repeated until the predetermined period of time elapses. Further, if it is determined that the steering torque has exceeded the predetermined value in step S233 (NO) or the vehicle speed is less than the predetermined value in step S234 (NO), operations from step S231 and onward are started again.

As described in the foregoing, the motor-driven power steering apparatus according to the third embodiment of the present invention includes the turning angle calculation portion 930*d*, the reference position estimation portion 293*e*, the torque sensor 910, and the vehicle speed sensor 103. The turning angle calculation portion 930*d* calculates the relative turning angle of the steering shaft 250. The reference position estimation portion 293*e* estimates the turning reference position of the steering shaft 250 based on movement of the steering shaft 250. The torque sensor 910 detects the steering torque. The vehicle speed sensor 103 detects the vehicle speed. If the condition, in which the detection value of the torque sensor 910 is equal to or less than the predetermined value and the detection value of the vehicle speed sensor 103 is equal to or more than the predetermined value, continues to exist for the predetermined period of time, the reference position estimation portion 293e estimates the turning reference position of the steering shaft 250.

According to the arrangements made in the third embodiment of the present invention, if the condition, in which the steering torque is equal to or less than a predetermined value and the vehicle speed is equal to or more than a predetermined value, continues to exist for a predetermined period of time, it can then be estimated that the absolute turning angle of the steering shaft 250 is maintained at a constant value (0°). It is then possible, based on the foregoing, to estimate the turning reference position of the steering shaft 250 and detect the absolute turning angle of the steering shaft 250.

Similarly to the first and the second embodiments of the present invention, the third embodiment of the present invention enables finely-tuned control of the steering assist force incorporating the parameter of the steering angle of the steering shaft 250, while achieving reduction in cost and weight by eliminating the need for the dedicated steering angle sensor or fail-safe measures.

The present invention is preferably applicable to a four-wheeled vehicle, including a vehicle intended for rough road use having a motor-driven power steering apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering angle sensor arrangement structure of the vehicle intended for rough road use having a handlebar disposed on an upper portion of a steering shaft and a motor-driven power steering apparatus disposed in a middle portion of the steering shaft, the motor-driven power steering apparatus including a power assist portion as an actuator unit and a steering angle sensor for detecting a steering angle, wherein the steering angle sensor is disposed on one end of the steering shaft, and wherein an upper arm support bracket extending downwardly from each of a pair of sub-inclined frames is disposed on opposite sides outside the steering angle sensor, thereby covering and protecting the opposite sides of the steering angle sensor.

* * * * *